US006751346B2

(12) United States Patent
Shimizu

(10) Patent No.: US 6,751,346 B2
(45) Date of Patent: Jun. 15, 2004

(54) IMAGE PROCESSING METHOD AND APPARATUS, AND RECORDING MEDIUM

(75) Inventor: Haruo Shimizu, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/237,923

(22) Filed: Jan. 27, 1999

(65) Prior Publication Data
US 2003/0081255 A1 May 1, 2003

(30) Foreign Application Priority Data
Jan. 11, 1998 (JP) .......................... 11-004071
Jan. 29, 1998 (JP) .......................... 10-016864

(51) Int. Cl.$^7$ ............................... G06K 15/00
(52) U.S. Cl. ............................... 382/162
(58) Field of Search ............... 382/162, 164, 382/173–176; 358/462, 1.9, 3.01, 3.06, 3.13, 3.21

(56) References Cited

U.S. PATENT DOCUMENTS 5,704,021 A * 12/1997 Smith et al. ............... 358/1.9
6,015,207 A * 1/2000 Winter et al. ............. 347/43
6,089,772 A * 7/2000 Takemura et al. .......... 400/625
6,226,011 B1 * 5/2001 Sakuyama et al. ......... 345/431

FOREIGN PATENT DOCUMENTS

JP    10-210306    8/1998    ........... H04N/1/60

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

Disclosed is an image processing method for executing color processing on an input image and outputting processed data to an output unit. The method comprises the steps of setting color processing conditions in accordance with an instruction from users, and executing color processing in accordance with the color processing conditions set in the above step, setting of the color processing conditions being selectively made in one of an automatic mode in which the color processing is automatically executed in accordance with a preset combination of object types and the color processing conditions, a semiautomatic mode in which the same color processing is set regardless of object types, and a manual mode in which a combination of object types and the color processing conditions is set in accordance with an instruction from users. An image forming apparatus and a recording medium for implementing the method are also disclosed. A setting process convenient for all kinds of users is provided, and color reproduction can be realized in response to various demands of users.

9 Claims, 20 Drawing Sheets

VERTICAL DITHER

→ MAIN SCAN (4*4-BASED VERTICAL DITHER+DISPERSION)

SUB-SCAN

CORRESPONDING TO 150 LINES

GRADATION DITHER

CORRESPONDING TO 107 LINES (GENERAL 45-DEGREE SCREEN)

RESOLUTION DITHER (4*4-BASED CENTRAL GROWTH + DISPERSION)

CORRESPONDING TO 150 LINES

INPUT DATA

| 74 | 53 | 32 | 80 |
|----|----|----|----|
| 23 | 5  | 11 | 58 |
| 45 | 21 | 16 | 37 |
| 65 | 43 | 64 | 85 |

DITHER MATRIX
(EACH ELEMENT DOES NOT EXCEED 255/3)

FIG. 17

| 0 INPUT | 0,0 | 0,1 | 0,2 | 0,3 | 1,0 ········ | 3,0 | 3,1 | 3,2 | 3,3 |
|---|---|---|---|---|---|---|---|---|---|
| | | | | | | | | | |
| 255 INPUT | 0,0 | 0,1 | 0,2 | 0,3 | 1,0 ········ | 3,0 | 3,1 | 3,2 | 3,3 |

(PROCESSING FLOWCHART)

IMAGE PROCESSING METHOD AND APPARATUS, AND RECORDING MEDIUM

BACKGROUND OF THE INVENTION

1. Field of the Invention

The present invention relates to an image forming method and apparatus as well as a recording medium with which color processing is performed depending on various types of objects (such as text, graphic, pictorial image, and gradation data) formed by, e.g., an application and having different features.

2. Description of the Related Art

With recent widespread use of color workstations (WS) and personal computers (PC), and low-price color printers represented by bubble jet printers (abbreviated to "BJ printers" hereinafter), a variety of color documents have been increasingly edited and formed by applications and then output.

Under the present state of art, however, it is very difficult to obtain a satisfactory result in color printing process for the problems below.

1) A color reproduction range (gamut) is different between a CRT that is employed by users to form color data and a printer for printing the color data. Generally, CRTs have a wider color reproduction range than printers, and printers cannot faithfully reproduce colors expressed by CRTs. A process for compressing a color space (i.e., color matching) is therefore required. Although there are proposed several methods for compression of a color space, it is generally difficult for users to judge which one of the methods is appropriate.

2) In relation to above 1), the additive color process using RGB is employed by CRTs to express colors, while the subtractive color process using YMCK is employed by color printers. Therefore, a color, which has been formed by a process of mixing multiple colors and confirmed on a CRT, may possibly differ from that reproduced by a printer.

3) Because recent color printers have a high resolution (e.g., 1200 or 600 DPI (Dot Per Inch), they require a finer printing process than required in preview of a document on CRTs. This results in necessity of selecting appropriate half-toning (process for conversion into two- or multi-valued data) depending on the usage.

4) In electrophotographic color printers represented by laser printers, coloring may slightly vary due to change over time and a difference among individual engines. Although several methods for controlling such a variation of coloring have been proposed, they are effective for some type of object (data), but may produce an adverse effect for another type of object (data).

Color documents include various types of objects (such as text, graphic, pictorial image, and gradation data) having different features. For example, a text contains a train of alphanumeric characters each being denoted by one byte, or a train of Chinese characters (kanji) each being denoted by two bytes. A pictorial image is made up of pixels in a two-dimensional array, and has different color information for each pixel. In some cases, pictorial image data is compressed for higher efficiency. A graphic is expressed by lines and contours or inner areas of polygons.

To realize good color reproduction in an output image, processes for solving the above-mentioned problems must be carried out depending on the feature of each object.

Taking into account the above, the inventors previously proposed a process and a UI (User Interface) for controlling several characteristics of print quality depending on the variety of objects.

The previous proposal was not satisfactory in points below. Because processing procedures were set over a very wide range, users were required to have deep knowledge for color processing. In other words, flexibility in setting was too wide for general users to select an appropriate process. Also, it took a long time to set an appropriate process in some cases.

SUMMARY OF THE INVENTION

In view of the above-mentioned state of art, an object of the present invention is to provide an image forming method and apparatus as well as a recording medium, which can offer a setting process convenient for all kinds of users, including general users and skilled users, and can realize color reproduction in response to various demands of users.

To achieve the above object, the present invention provides an image processing method for executing color processing on an input image and outputting processed data to an output unit, the method comprising the steps of setting color processing conditions in accordance with an instruction from users, and executing color processing in accordance with the color processing conditions set in the above step, setting of the color processing conditions being selectively made in one of an automatic mode in which the color processing is automatically executed in accordance with a preset combination of object types and the color processing conditions, a semiautomatic mode in which the same color processing is set regardless of object types, and a manual mode in which a combination of object types and the color processing conditions is set in accordance with an instruction from users.

Other objects and features of the present invention will be apparent from the following detailed description of a preferred embodiment of the present invention with reference to the drawings.

BRIEF DESCRIPTION OF THE DRAWINGS

FIG. 17 is a representation for explaining the principle to realize the dithering by hardware.

DESCRIPTION OF THE PREFERRED EMBODIMENT

In a preferred embodiment of the present invention, a color matching process to solve the problems 1) and 2) described above in connection with the related art, a half-toning process to solve the problem 3), and a color adjusting process to solve the problem 4) are set depending on the type of objects.

The color matching process will be first described below.

The color matching process is a process for converting color image data depending on the color reproduction range of an output device. When outputting an image displayed on a CRT by a printer, for example, the printer cannot faithfully reproduce the displayed image because the color reproduction range of the printer is narrower than that of the CRT. A conversion process must be therefore performed so that coloring of an output image is as close as possible to that of the displayed image.

Figure 5:
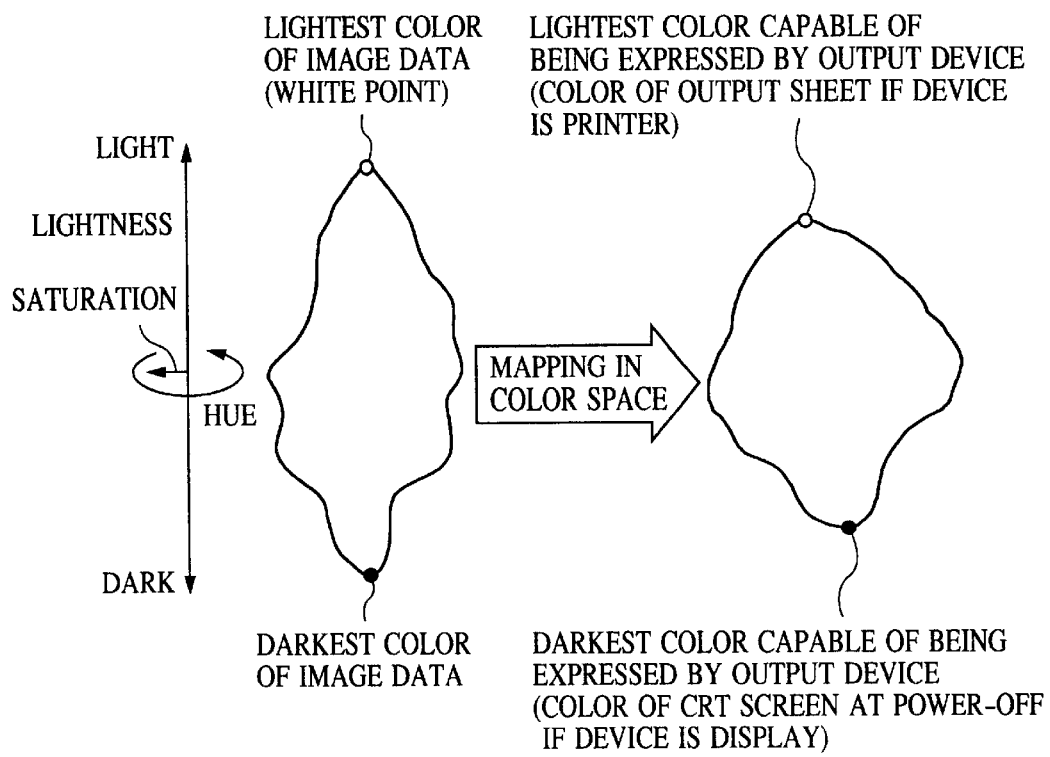
FIGS. 5(1) and 5(2) are representations showing correlation between input colors and print colors applied to a printer.
Figure 5:
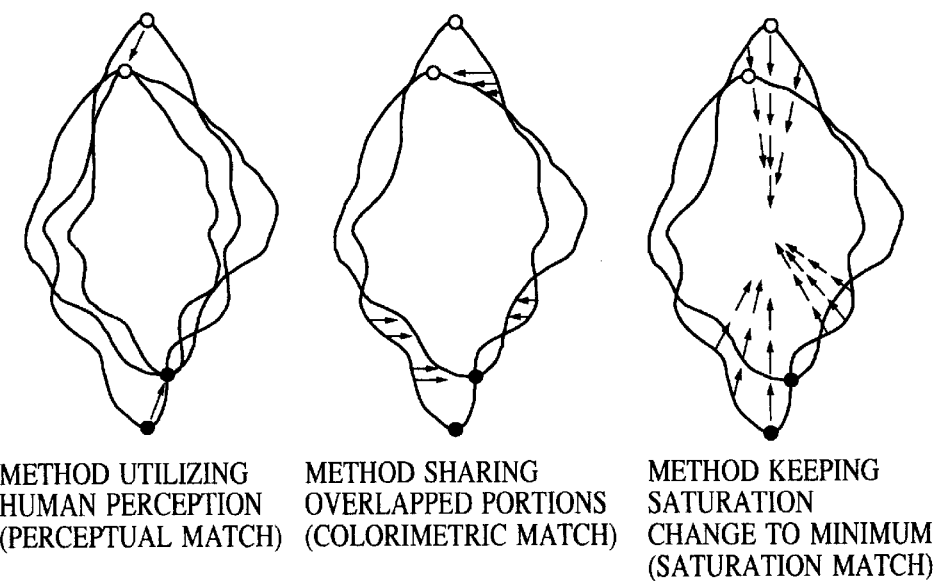

Several methods, which have been proposed for carrying out the color matching process, will be described with reference to FIG. 5.

1) Perceptual Match (Preference for Coloring)

The lightest color (white point) and the darkest color (black point) of image data are matched with those of an output device, respectively. Then, other colors are transformed while the correlation with respect to the white point and the black point is kept unchanged. Although all colors are transformed to colors different from the originals, it is possible to maintain both the correlation between colors and gradation of colors. This method is suitable for natural images and photographic images in which a large number of colors are contained and gradation is important.

2) Colorimetric Match (minimum color difference)

Colors in an area, where the color reproduction ranges of image data and an output device are matched with each other, are output as they are without transform. Colors outside the above area are mapped to outer edges of the color reproduction range of a printer without changing the lightness. This method is suitable for expressing colors with fidelity in the case of printing, for example, logo marks and images in match with color samples.

3) Saturation Match (preference for saturation)

A color space is compressed in such a manner as not changing (reducing) saturation as small as possible for colors outside the color reproduction ranges of a printer. This method is suitable for images used in CG (Computer Graphics), presentation and so on in which images should be expressed with high saturation.

4) No Match

Color data designated by an application is sent to and printed by a printer as it is without any color transform process. Because of including no color matching process, the color data can be printed at a high speed. This method is suitable for printing, e.g., characters which requires no consideration of color accuracy.

Based on the characteristics of the various color matching processes described above, default color matching characteristics are set for respective objects in this embodiment as listed in Table 1 below.

Note that matching parameters for use in the color matching process are obtained by calculating the color reproduction range of a printer from several typical sample data, and then computing the matching parameters with the aid of simulation. The matching parameters are stored in the form of, e.g., a multi-dimensional LUT (Look-Up Table).

TABLE 1

| | |
|---|---|
| Characters | None |
| Graphics | Saturation |
| Pictorial images | Perceptual |

Next, the half-toning process will be described.

The half-toning process is a process for, after the above-mentioned color matching process (space compressing process) has been performed for input full-color image data, executing color transform into a YMCK color space of a printer and eventually mapping the image data in accordance with the color accuracy (e.g., 1, 2, 4, or 8 bits for each color) of the printer. Among various methods proposed, typical ones are quantizing processes such as an error diffusion process and a dither process.

1) Error Diffusion Process

Before some pixel is quantized into a certain number of output bits, an quantization error between the input pixel and a threshold for the quantization is propagated to adjacent pixels at a certain rate for preservation of density. As a result, a cyclic noise pattern resulted in the dither process is eliminated, and good image quality is obtained. This process is however inferior to the dither process in processing speed. Also, it is difficult to apply the error diffusion process to objects that are output in random order and in random positions, such as PDL (Page Description Language) data, in points of processing speed and dealing of image overlaps. Incidentally, this process is suitable for a system of rendering one page of a document on the host side and transmitting page data as an image in a sequential manner, the system being employed in BJ printers, etc.

2) Dither Process

This process is to express gradation for a plurality of pixels together, which lie within a certain area. Scattering dither and cluster dither are known as typical ones. The former is a process intending to disperse a cyclic pattern specific to the dither as far as possible, whereas the latter constitutes a dither pattern by concentrating dots conversely to the former. In other words, the scattering dither provides a larger number of screen lines than the cluster dither. Also, in many of electrophotographic printers, the cluster dither is employed in consideration of the problem that dot reproducibility is reduced at a high resolution (600 DPI).

Recently, the so-called blue noise masking process has been proposed in which a random pattern similar to that used in the error diffusion process is formed with a large dither matrix size of 256×256, for example. Thus, the distinction between the error diffusion process and the dither process is practically of little significance.

Figure 6:
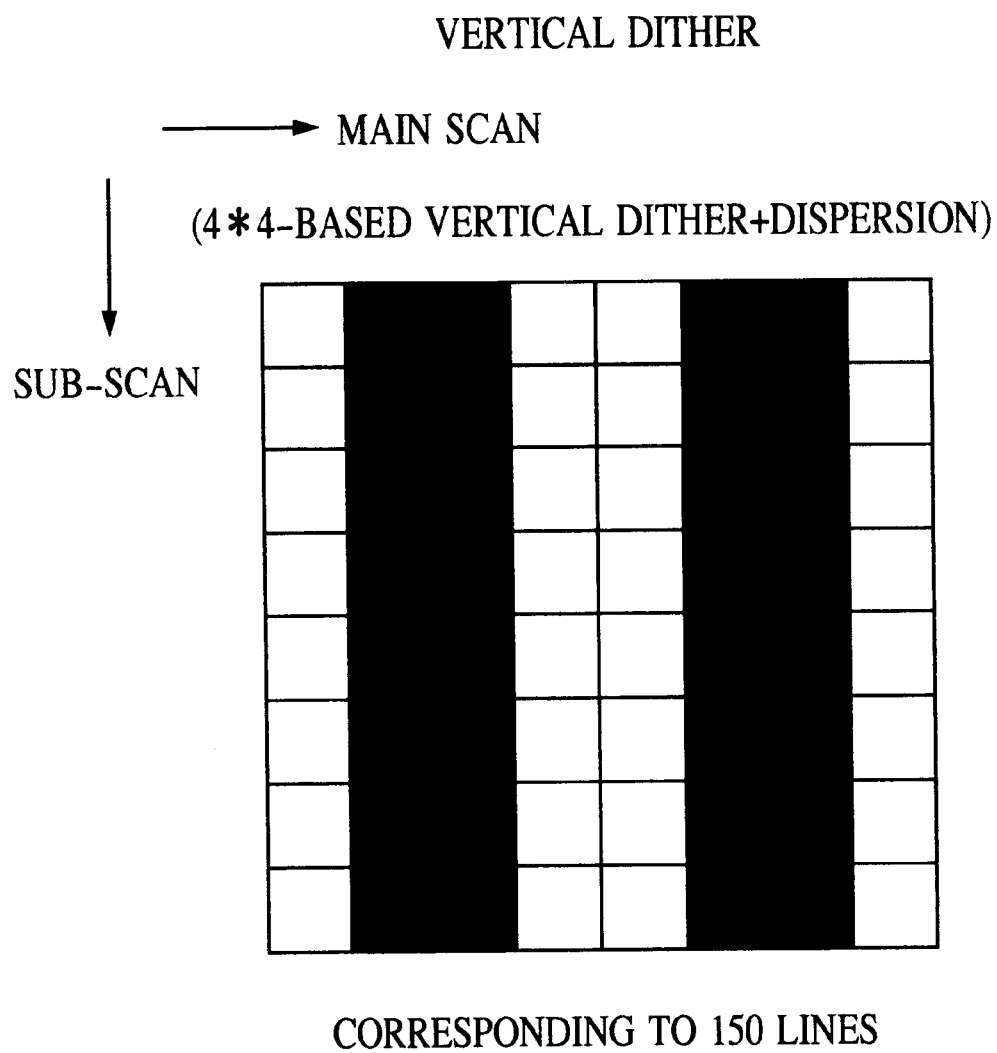
FIG. 6 is a representation for explaining a process of vertical dither.
Figure 7:
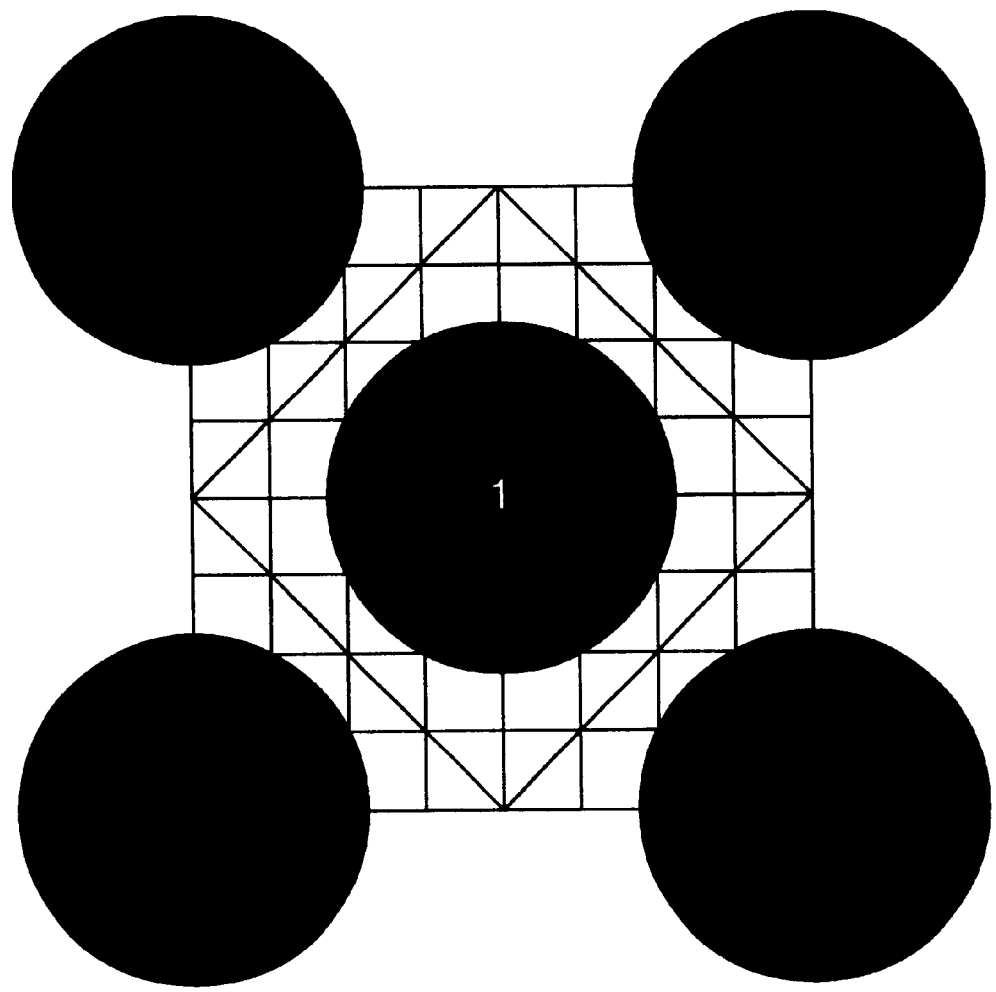
FIG. 7 is a representation for explaining a process of gradation dither.
Figure 8:
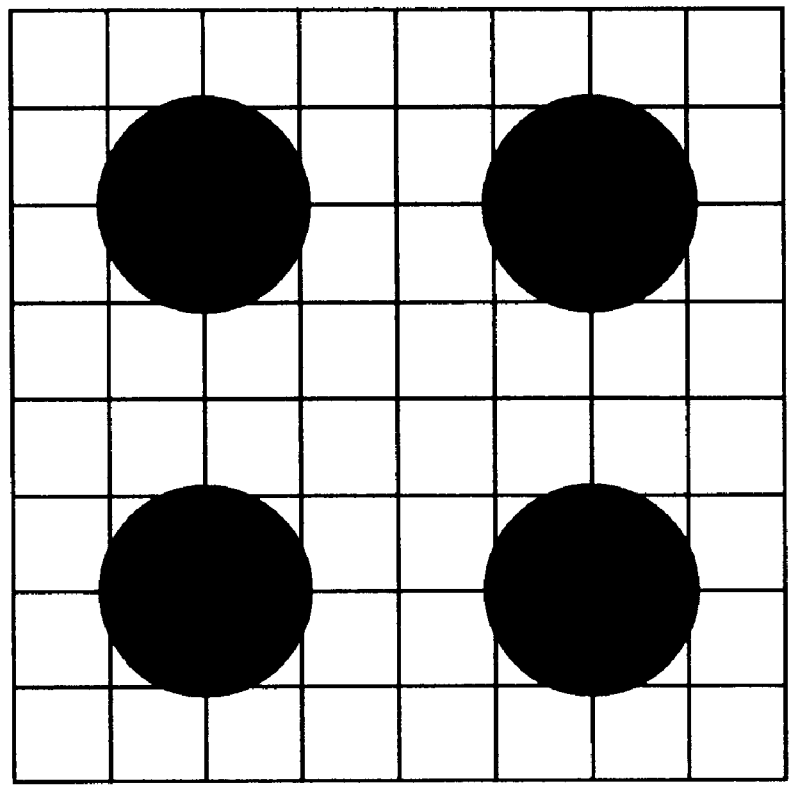
FIG. 8 is a representation for explaining a process of resolution dither.

The cluster dither will now be described in more detail with reference to FIGS. 6 to 8. For simplification of the description, it is assumed that the dither matrix size is 8×8 and the dot resolution is 600 DPI. FIGS. 6 to 8 schematically show analog dot patterns used in respective dither processes for expressing a 50% density level.

Gradation dither is a process that employs a pattern having 45-degree screen angle as shown in FIG. 7 and is close to general commercial halftone printing. The number of screen lines representing a dither cycle is 107 lpi (Lines Per Inch). This dither pattern is optimum for monochrome printing, but causes the following problem when applied to color printing in which color prints of YMCK are superimposed. If the print dots shift from each other due to a mechanical error in registration for each color, there would occur a moire pattern or color muddling because of superimposition of the colors.

Vertical dither is a process of growing a dither pattern in the sub-scan direction of printing as shown in FIG. 6. Since an error in registration is remarkable particularly in the sub-scan direction due to the electrophotogrphic process, this dither pattern is suitable for solving such a problem. The number of screen lines is 150 as shown, and therefore image expression with a high resolution can be obtained. However, the vertical dither provides gradation inferior to the gradation dither. Also, as seen from the illustrated dither pattern, when a thin vertical line (one or two dots) is drawn in medium tone, the line would be not printed if it matches with an off-period (indicated by white areas in FIG. 6) of the dithering.

Resolution dither shown in FIG. 8 has a intermediate property between the gradation dither and the vertical dither.

Advantages and disadvantages in characteristics of those three dither processes are listed in Table 2 below.

TABLE 2

|  | Gradation dither | Vertical dither | Resolution dither |
| --- | --- | --- | --- |
| Number of lines | 107 (Δ) | 150 (○) | 150 (○) |
| Gradation | ○ | Δ | Δ |
| Color stability | x | ○ | Δ |
| Expression of thin lines | ○ | Δ | Δ |

○: good  Δ: moderate  x: no good

Based on the above characteristics, the optimum dither for various objects is selected as listed in Table 3 below. The resolution or vertical dither having the larger number of lines is suitable for characters and pictorial images, whereas the gradation dither is suitable for graphics to achieve clear expression of gradation data and good reproducibility of thin lines.

TABLE 3

| Characters | Resolution (Vertical) |
| --- | --- |
| Pictorial images | Resolution (Vertical) |
| Graphics | Gradation |

Finally, a color adjusting function will be described. The reason why this function is important is as follows. In the electrophotographic process, generally, data is printed on a sheet of paper through complicated analog processes comprising laser exposure, development, transfer and fixing. Further, color printing requires a sequence of the above processes to be repeated four times, i.e., once for each toner of YMCK. It is very difficult to carry out printing of four colors with a uniform density and a uniform dot arrangement.

In terms of a reflection density level, an error on the order of ±0.1 for each color usually appears. For this reason, users are required to make color adjustment using the color adjusting function.

Figure 21:
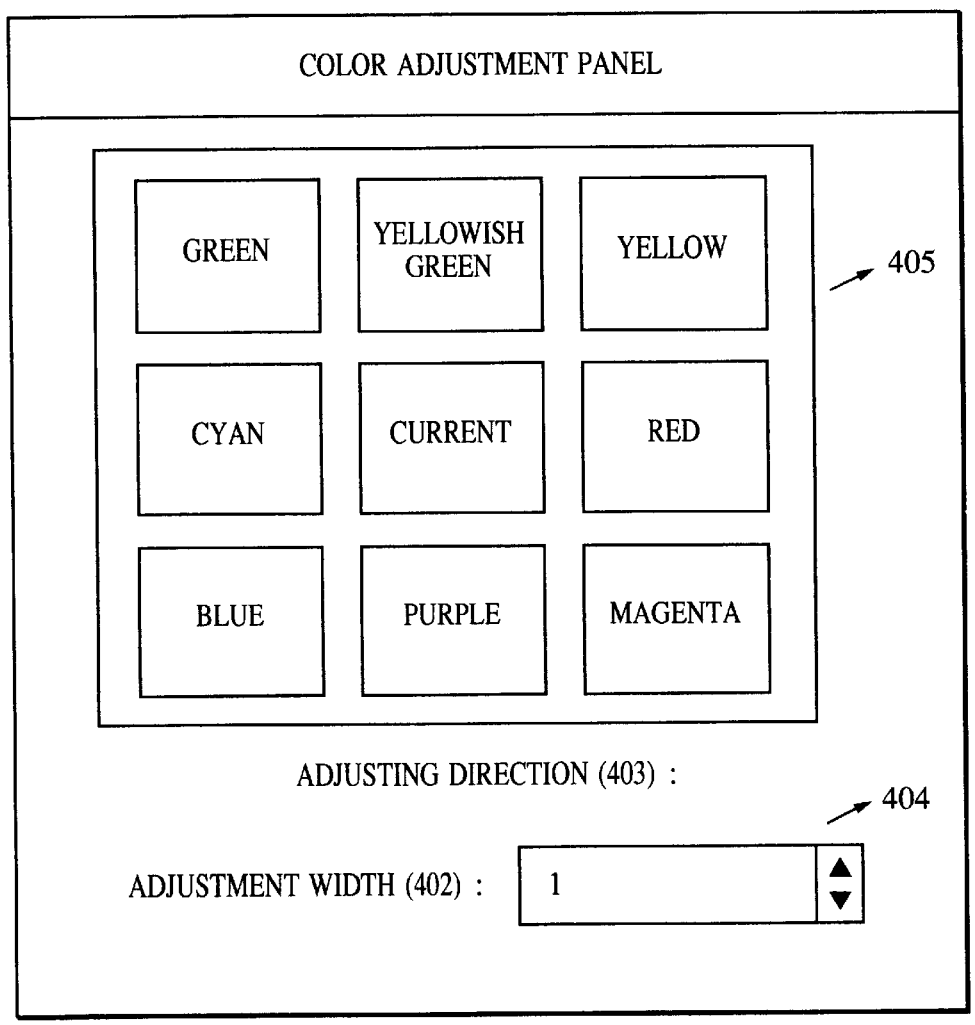
FIG. 21 shows a user interface for color adjustment.

In this embodiment, the hue of data designated by an application is changed so as to cancel a variation of coloring developed by a printer using a UI shown in FIG. 21. A processing algorithm for changing the hue is as follows.

Figure 20:
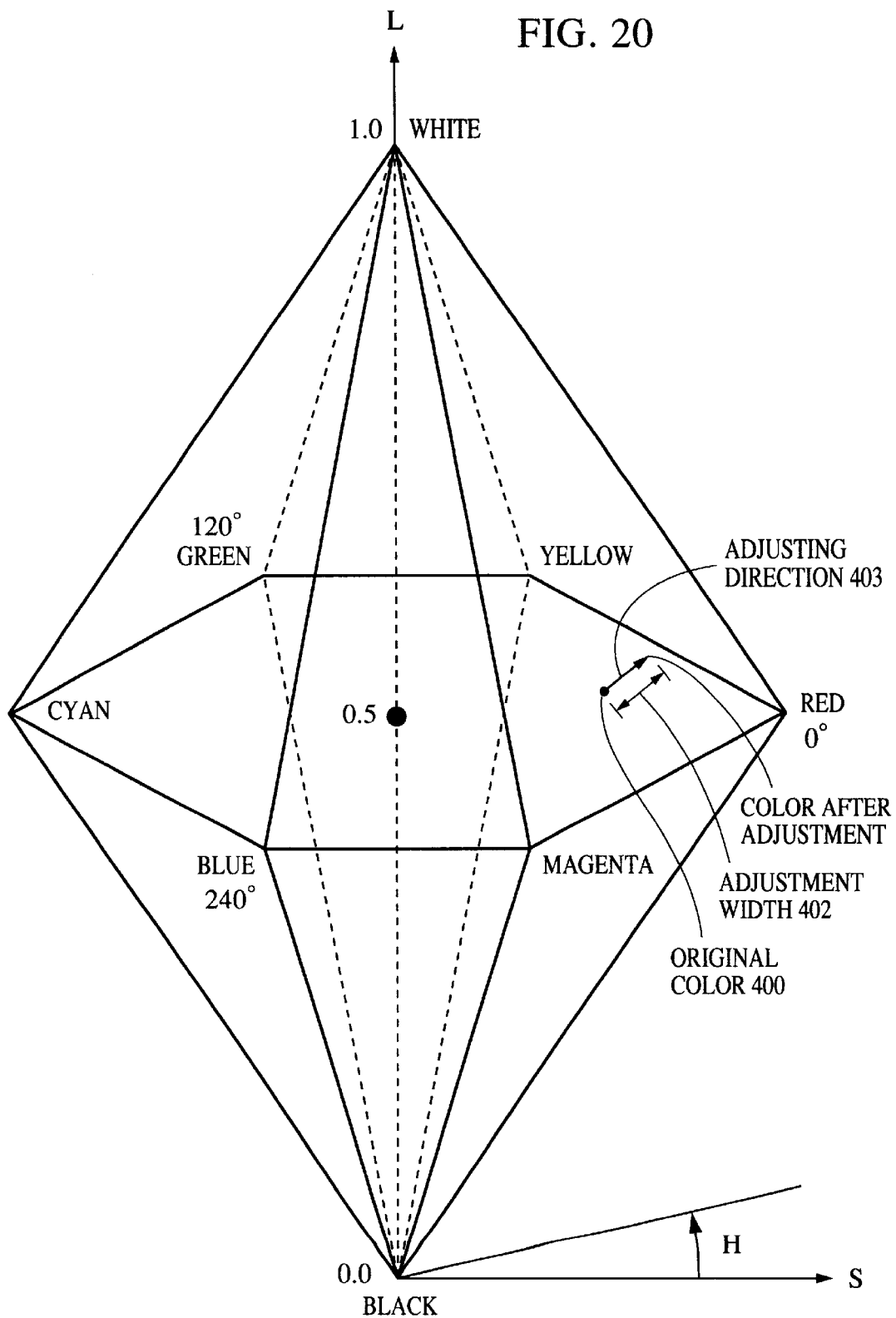
FIG. 20 is an explanatory view for color adjustment using an HLS color space.

1) First, an input RGB color is transformed into an HLS (Hue, Lightness, Saturation) color (see FIG. 20). A transform formula is described in "Computer Graphics Principles and Practice", Addison-Wesley Publishing Company.

2) Then, values of the hue and saturation of an original color 400 are changed in accordance with an adjusting direction 403 and an adjustment width 402 of coloring, which are designated by users using the UI shown in FIG. 21, while an L-value is kept unchanged. FIG. 20 shows an adjustment example in which the adjusting direction 403 is set toward yellow. Here, the adjustment width 402 is set by directly entering a numerical value through a panel block 404, or by depressing a button to add or subtract a desired number from a reference value. The adjusting direction is designated by clicking one of boxes indicating directions of change toward eight hues in a panel block 405, which corresponds to the desired direction of change.

3) Finally, reverse mapping from the HLS space, in which the color adjustment has been made, to the RGB space is performed. This process is also described in the same reference book as mentioned in 1).

In a color printer which tends to apply a larger amount of Y (Yellow) toner and output a yellowish image, for example, appropriate coloring is realized by modifying the color in the direction toward a complementary color (blue) for yellow with the above color adjusting function.

The color adjusting function acts effectively for a pictorial image in which a plurality of colors are mixed. For example, however, if pure yellow in characters and graphics is modified in the direction toward blue, C (Cyan) toner and M (Magenta) toner would be mixed in Y toner, thus resulting in a difficulty in reproducing an image of pure yellow and an adverse effect of muddling the color.

In this embodiment, therefore, the color adjusting function is turned on or off as default setting, as shown in Table 4 below.

TABLE 4

| Characters | Off |
| --- | --- |
| Pictorial images | On |
| Graphics | Off |

Additionally, since color adjustment is generally difficult for unskilled users to carry out, it is possible to employ a manner of enabling users to simply judge the optimum setting by printing thumbnail images adjusted in the directions toward eight hues as described in Japanese Unexamined Patent Laid-Open No. 10-210306.

Appropriate default combinations of color matching, halftoning and color adjustment processes for the respective objects are obtained from Tables 1, 3 and 4. However, the default setting does not always produce the best printing result for all images. An optimum combination of those processes varies depending on the usage and the preference of users.

In view of the above, this embodiment is designed to enable users to set one of a full-automatic mode, a semiautomatic mode, and a manual mode (described later) depending on the usage through a user interface. Priority of starting the process in each mode is determined in the named order, i.e., full-automatic, semiautomatic, and manual.

In the full-automatic mode, the color matching, half-toning and color adjustment processes corresponding to the characteristic of an output device are automatically selected depending on the type of objects based on the default setting combinations shown in Tables 1, 3 and 4.

In the semiautomatic mode, users can select desired one of several combinations of color matching, half-toning and color adjustment processes that have been registered beforehand. The semiautomatic mode carries out the same processes regardless of the type of objects. Stated otherwise, in the semiautomatic mode, users are not required to set individual contents of the respective processes, and can simply set the processes as one combination in accordance with the important feature of an image.

In the manual mode, combinations of color matching, half-toning and color adjustment processes are selected individually with respect to the various types of objects. The manual mode enables users to set the processes in details depending on the type of objects.

As mentioned above, the processing result in the full-automatic mode is not always the best for all images. If the processing result in the full-automatic mode is not sufficient, users select the semiautomatic mode and change the setting of color matching, half-toning and color adjustment processes as one of several combinations for the whole of a page and all the types of objects while attaching much importance to a certain portion where there is a problem. Thus, by employing the semiautomatic mode, even users who have not so deep knowledge can modify the default setting of the processes so as to obtain desired color reproduction.

Generally, what is important in color reproduction of an output image is how the color of an important object is reproduced. Therefore, a significant problem hardly occurs in point of color reproduction by carrying out the processes, which are set to be adapted for an important object in an image, on other different objects contained in the image as well.

It is however a matter of course that setting the appropriate processes individually for the various types of objects provides higher accuracy of color reproduction of an output image. Accordingly, the manual mode is included so that demands of such users as designers who have deep knowledge and try to obtain high color reproduction, for example, are satisfied.

A color printer, a printer controller and a host PC for realizing the operation of this embodiment will now be described. First, a system configuration of a controller 200 on the printer side will be described with reference to a block diagram of FIG. 9. Color PDL data sent from the side of a host computer 502 is stored in an input buffer 2, and the input data is scanned by a PDL command analyzing program 61 in a program ROM 6. Numeral 3 denotes a font ROM for storing character bit pattern or outline information, character base lines, and character metric information, the font ROM being employed in printing of characters. A panel IOP 4 is an I/O processor and firmware for dealing with functions of detecting switch inputs from a panel mounted on a printer body, and indicating messages on an LCD. The panel IOP 4 is constituted by a low-price CPU. An add-on I/F 5 serves as an interface circuit for connection with add-on modules (such as a font ROM, a program ROM, a RAM and a hard disk) of the printer.

Numeral 6 denotes a ROM for storing software on the printer side in this embodiment. A CPU 12 reads data from the ROM 6 and executes processing of the data. A software management RAM 7 stores a display list 71 resulted from converting the input PDL data into the intermediate data form (page object) by the command analyzing program 61, global information, and so on.

A color transform hardware (H/W) 8 is hardware for transforming color data from the RGB (additive) color representation system of monitors which are usually employed in work-stations and personal computers, into the YMCK (subtractive) color representation system that is employed in the ink process of printers. This transform process requires a very large computation power if non-linear log transform, sum of products computation using a 3×3 matrix, etc. are used to achieve high color accuracy. Therefore, this embodiment employs a look-up table and an interpolation process. The table is initially set to be optimum for a printer engine (e.g., an LBP (Laser Beam Printer)) 100, but values of the table are changeable if a request for modifying the color transform process or parameters is applied from the host side in response to change of a density calibration process and a target process.

Incidentally, if the sacrifice of processing time is allowed, computation for the color transform can also be executed by software in the CPU 12.

A hard renderer 9 executes a color rendering process by ASIC hardware to perform the rendering process in real time in synch with video transfer to the printer (e.g., LBP) 100 so that a banding process is realized with a smaller memory capacity. A page buffer 10 is an area for storing an image developed by the PDL, and requires a memory of at least two bands for carrying out the banding process (i.e., for executing real-time rendering and video transfer to the printer in units of band in parallel). Where the banding process cannot be performed for the reason of, e.g., incapability of real-time rendering, a full-color bit map memory with lowered resolution and/or color degradation must be prepared for a printer engine, such as an LBP, which requires an image to be transferred in synch with the engine. On the other hand, for a machine, such as a bubble jet printer (BJP), in which movement of a head can be controlled on the controller side, a band memory is just required.

A dithering unit 15 stores a plurality of dither patterns, which are used by the hard renderer 9 to execute the half-toning process at a high speed in a banding manner. The dither pattern memory 15 also stores a pointer for pointing one of the dither patterns corresponding to the types of objects that is designated from the host side.

A printer interface (I/F) 11 is disposed between the controller 200 and the color printer (e.g., LBP) 100 and transfers, as video information, the contents of the page buffer 10 in synch with horizontal and vertical synchronizing signals on the printer side. In the case of the printer being a BJP, the printer interface 11 transfers video information in match with head control and head size of multiple lines in the BJP. The printer interface 11 also transmits commands to the printer and receives status information from the printer.

The CPU 12 is a processing unit to control processes executed in the printer controller. Numeral 100 denotes a color printer for printing a video signal sent from the controller. The color printer 100 may be either an electro-photographic color LBP or a BJP.

Numeral 200 denotes the whole of a printer controller for realizing the operation of this embodiment.

Figure 1:
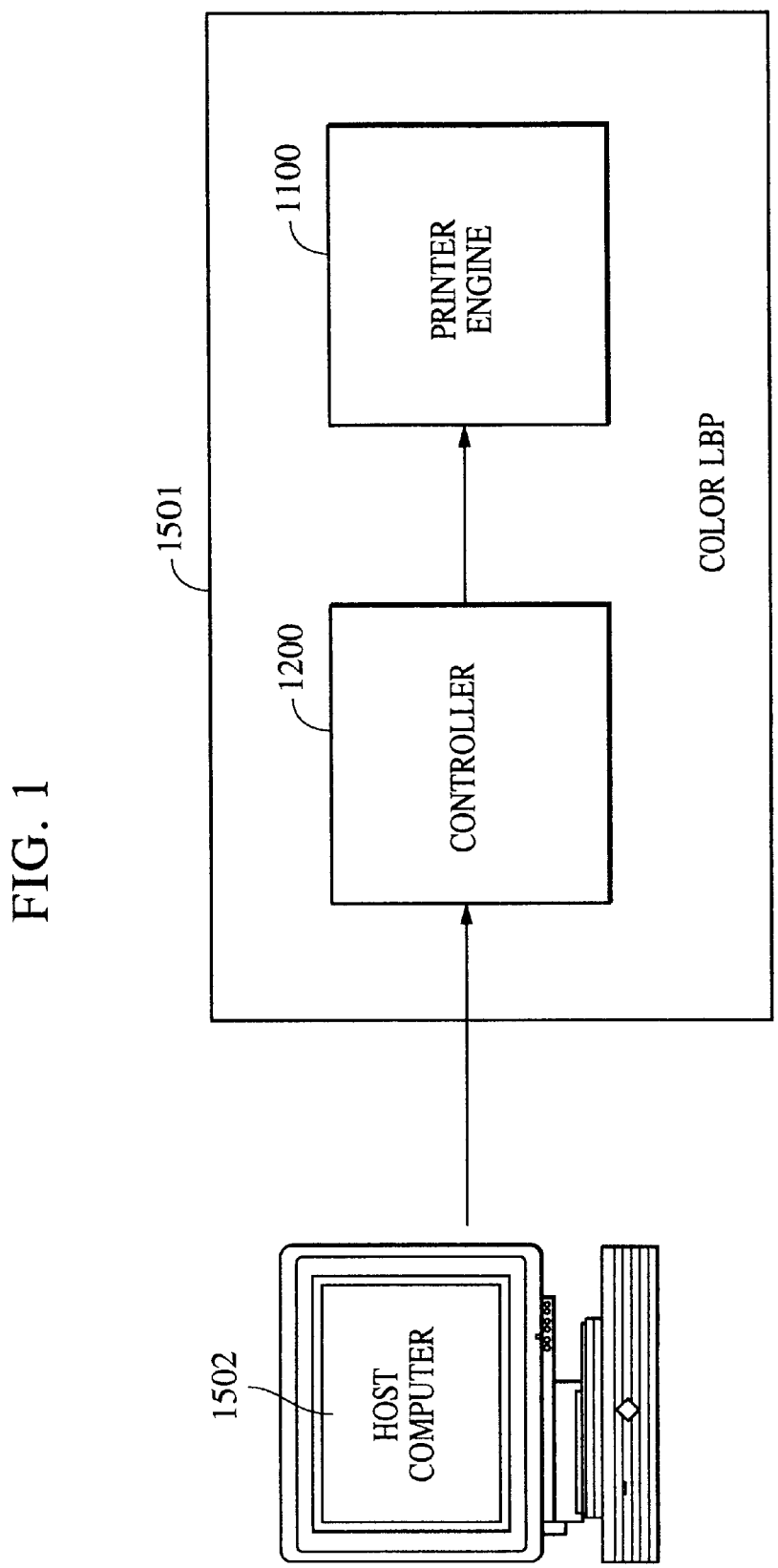
FIG. 1 is a block diagram of a system.

FIG. 1 is a block diagram showing a schematic construction of a color LBP according to one embodiment of the present invention. A color LBP 501 receives code data and image data that are written in the printer language and sent from a host computer 502 as an external apparatus, and then forms a color image on a sheet of recording paper (recording medium) based on the received data.

Figure 2:
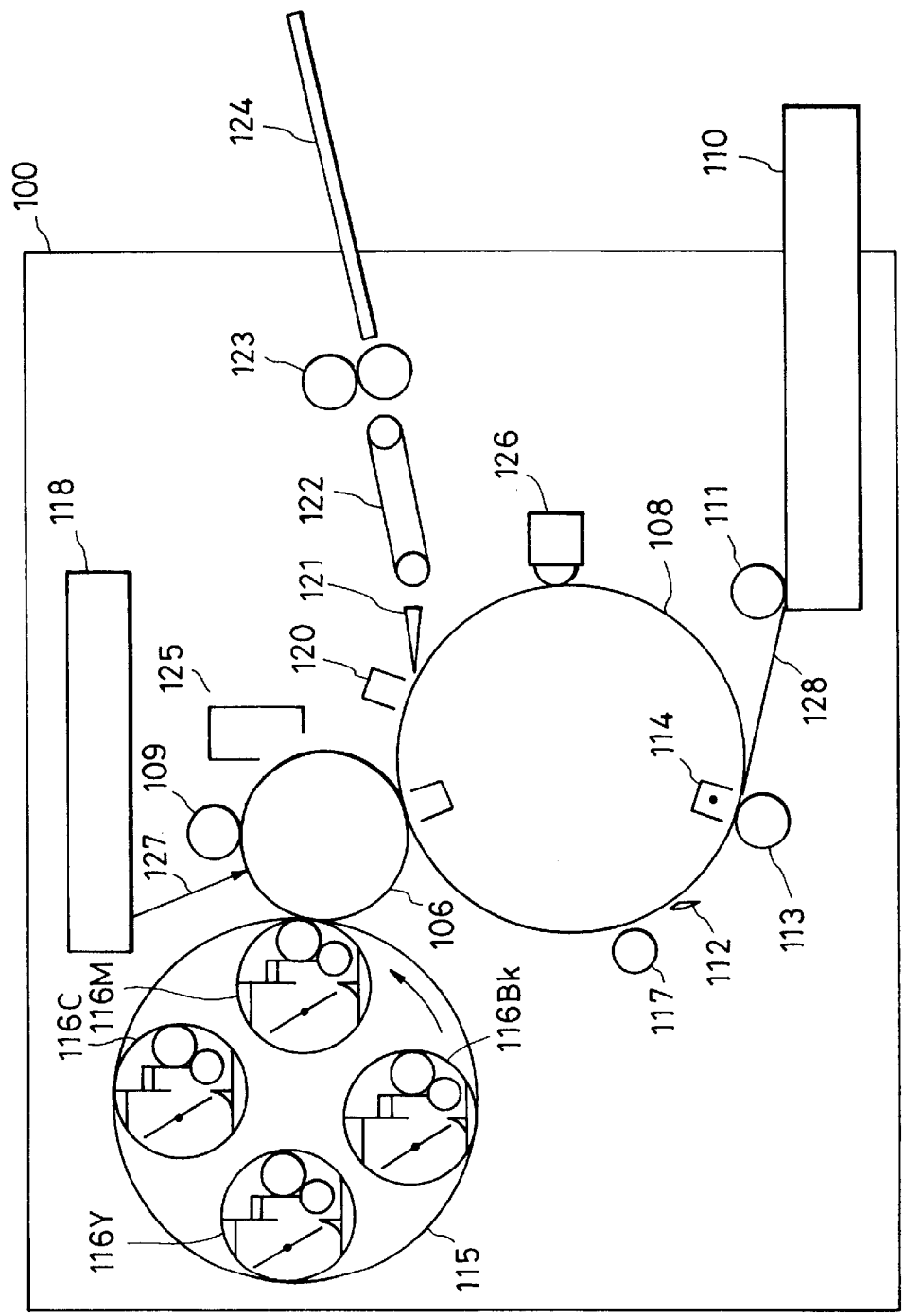
FIG. 2 shows a detailed construction of a color printer.
Figure 3:
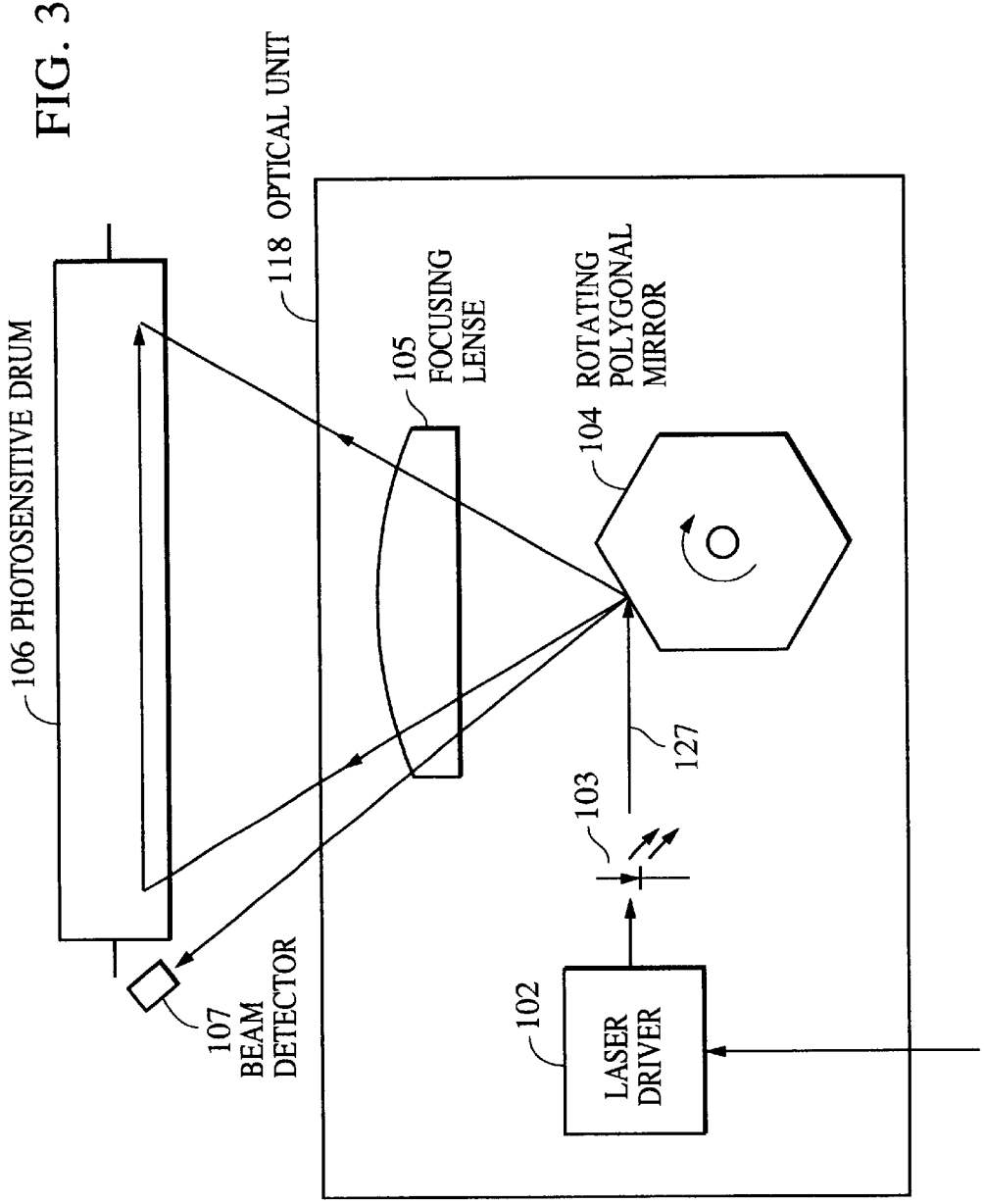
FIG. 3 shows details of an optical system in FIG. 2.

More specifically, the color LBP 501 comprises a printer controller (referred to simply as a "controller" hereinafter) 200 and a printer engine (referred to simply as an "engine" hereinafter) 100. Based on data received from the host computer 502, the controller 200 forms multi-valued image data for one page of four colors, i.e., magenta, cyan, yellow and black. The engine 100 prints an image through a series of electrophotographic processes including the steps of scanning a photosensitive drum by a laser beam modulated in accordance with the multi-valued image data produced by the controller 200, thereby forming latent images, developing the latent images with toners, transferring the developed image onto a sheet of recording paper, and fixing the toners on the sheet of recording paper. The engine 100 has a resolution of 600 DPI. FIGS. 2 and 3 show one example of a detailed construction of the engine 100. The operation of the engine 100 will be described below with reference to FIGS. 2 and 3.

In FIGS. 2 and 3, a driving means (not shown) provided in the engine 100 rotates a photosensitive drum 106 and a transfer drum 108 in directions of arrows in the drawings. Then, a roller charger 109 starts charging to substantially uniformly charge a surface of the photosensitive drum 106 to have a predetermined value of potential. Subsequently, one of sheets of recording paper 128 contained in a recording paper cassette 110 is supplied to the transfer drum 108 by rotating a paper feed roller 111. The transfer drum 108 is constructed by coating a hollow support with a dielectric sheet, and is rotated in the direction of arrow at the same speed as the photosensitive drum 106. The sheet of recording paper 128 supplied to the transfer drum 108 is held by a gripper 112 provided on the support of the transfer drum 108, and is attracted to the transfer drum 108 by cooperation of an attracting roller 113 and an attracting charger 114. At the same time, a developer support 115 is rotated to position one of four developers 116Y, 116M, 116C and 116K supported on the support 115, which is used to form a first latent image, to face the photosensitive drum 106. The developers 116Y, 116M, 116C and 116K contain toners of yellow (Y), magenta (M), cyan (C) and black (K), respectively. The engine 100 detects the leading end of the sheet of recording paper 128 attracted to the transfer drum 108 by a sheet end sensor 117, and transmits a control signal to the controller 200. Upon receiving the control signal, the controller 200 outputs a video signal (not shown) to a laser driver 102 in an optical unit 118. The laser driver 102 causes a laser diode 103 to illuminate in response the video signal, thus emitting a laser beam 127. The laser beam 127 is deflected by a rotating polygonal mirror 104 which is driven by a motor (not shown) to rotate in the direction of arrow. The deflected laser beam passes a focusing lens 105 disposed on an optical path, and scans the photosensitive drum 106 in the direction of main scan to form a latent image on the photosensitive drum 106. At this time, a beam detector 107 detects the scan start point of the laser beam 127 and then produces a horizontal synchronizing signal. The latent image formed on the photosensitive drum 106 is developed by the developer and is transferred by a transfer charger 119 onto the sheet of recording paper 128 attracted to the transfer drum 108. The toner that is not transferred and is remaining on the photosensitive drum 106 is removed by a cleaning device 125. By repeating the above operation, a color toner image is transferred onto the sheet of recording paper 128. The sheet of recording paper 128, onto which all toner images have been transferred, is peeled off from the transfer drum 108 by a separating pawl 121 after passing a separating charger 120, and is then sent to a fixer 121 by a conveyor belt 122. In parallel, the surface of the transfer drum 108 is cleaned by a transfer drum cleaner 126. The toner images on the sheet of recording paper 128 are melted and fixed under heating and pressure both applied from the fixer 123 so as to become a full-color image. The sheet of recording paper 12 including the full-color image recorded thereon is discharged to a paper ejection tray 124.

Figure 4:
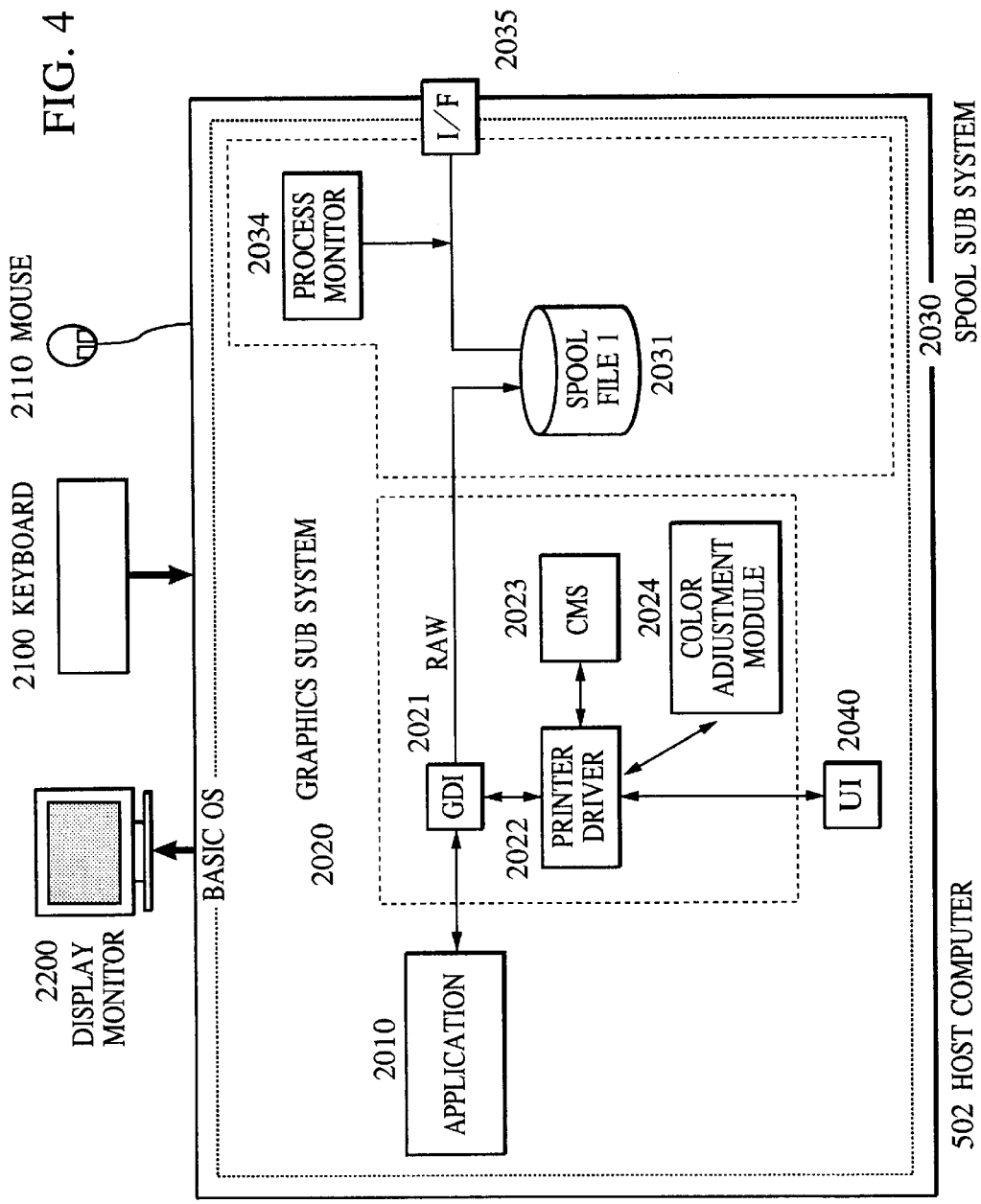
FIG. 4 is a block diagram of a system on the host side.

A system configuration on the host side will now be described with reference to FIG. 4. In FIG. 4, the host computer 502 outputs, to the printer engine 100, printing information comprised of print data and control codes. The host computer 502 is constructed as one computer system including a keyboard 2100 as an input device, a mouse 2110 as a pointing device, and a display monitor 2200 as a display device. It is assumed that the host computer 502 is operated in accordance with a basic OS such as Windows 95 produced by Microsoft Co.

Looking at functions working on the basic OS on the host computer side while focusing on only those portions which are concerned with the operation of this embodiment, the functions are mainly executed by an application 2010, a graphics sub system 2020 as an image information processing means, a spool sub system 2030 including a data storage means, a print data storage/control means and a means for communicating with the printer engine, and a UI processing unit 2040.

The application 2010 is, for example, an application software operating on basic software and used for word processing, tabulation and calculation, etc. The graphics sub system 2020 comprises a Graphic Device Interface (abbreviated to "GDI" hereinafter) 2021 as a part of the functions of the basic OS, and a printer driver 2022 as a device driver dynamically linked from the GDI. An important role of the printer driver 2022 is to convert a GDI drawing command into the PDL language.

Also, the printer driver 2022 commits the processing to a CMS (Color Management System) module 2023 and a color adjustment module 2024 depending on the mode designated by users and the type of GDI drawing command.

The spool sub system 2030 is a sub system which is disposed downstream of the graphics sub system 2020 and is specific to a printer device. The spool sub system 2030 comprises a spool file 1 (practically in the form of a hard disk) 2031 as a first data storage means, and a process monitor 2034 for reading PDL codes stored in the spool file and monitoring the progress of processing in the printer engine 100.

The user interface (UI) processing unit 2040 displays various menu buttons and analyzes user actions by utilizing functions provided by the basic OS so that users can determine control parameters for printing quality.

The names and functional frames mentioned above may differ slightly depending on the type of basic OS. So long as the system includes modules capable of realizing the intended technical means, those names and functional frames are not of much importance in point of implementing the present invention.

For example, the so-called spooler and spool file can also be realized by incorporating the processing in a module that is called a print queue in another OS. The host computer 502 including the above-described modules is generally controlled by software, called basic software, with hardware, not shown, such as a central processing unit (CPU), a read-only memory (ROM), a random access memory (RAM), a hard disk drive (HDD), and various input/output control units (I/O). The application software and the sub system processes operate as function modules under the basic software.

A processing flow on the printer driver side will be described below in detail.

Figure 10:
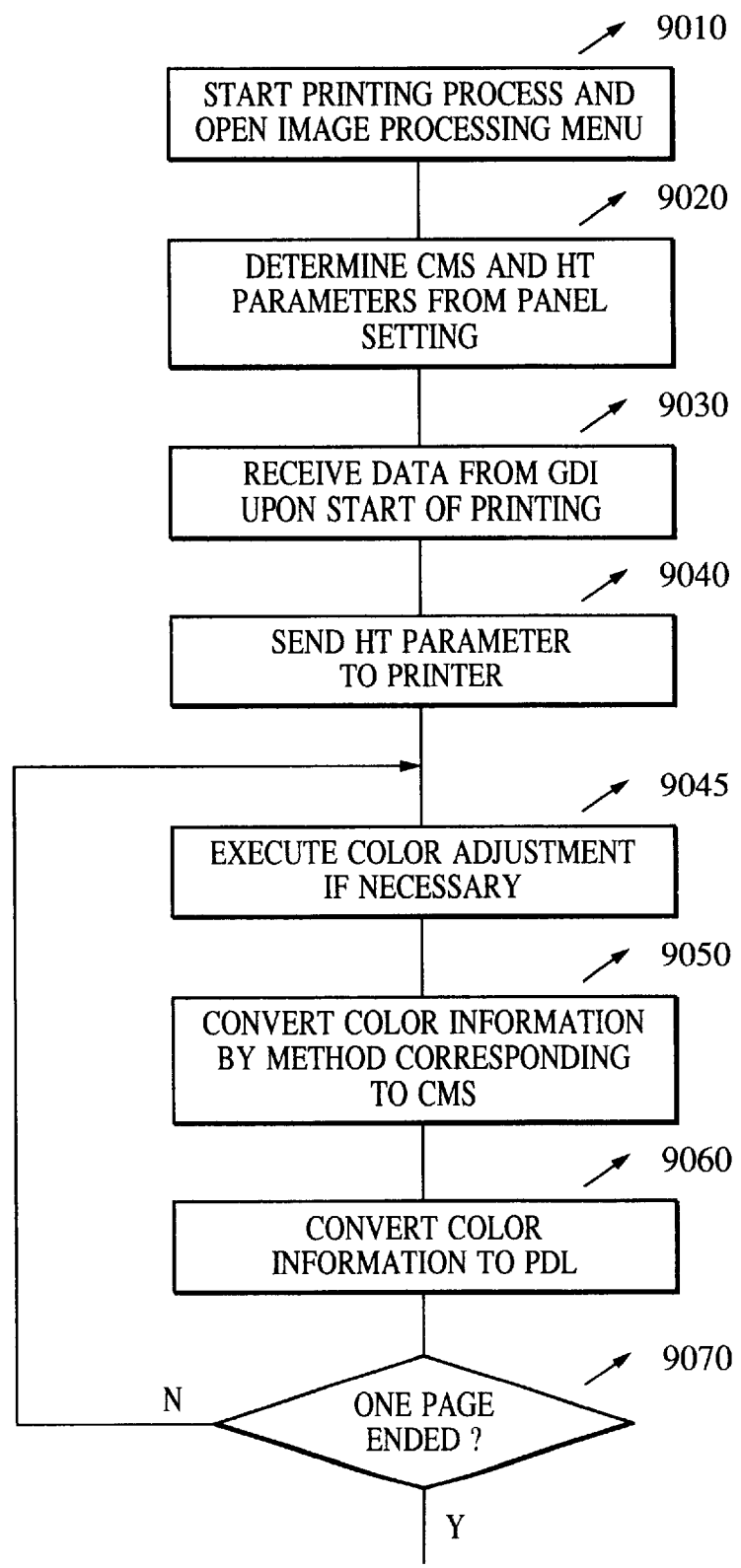
FIG. 10 is a flowchart of details of a printing process.

First, the processing flow on the host side will be mainly described with reference to a flowchart of FIG. 10 that shows the processing specific to the operation of this embodiment. When a printing menu is clicked from some application on the host computer, a printing main sheet appears. On the printing main sheet, user instructions related to image quality along with an output printer, a sheet size, the number of copies, etc. are entered (step 9010).

Figure 11:
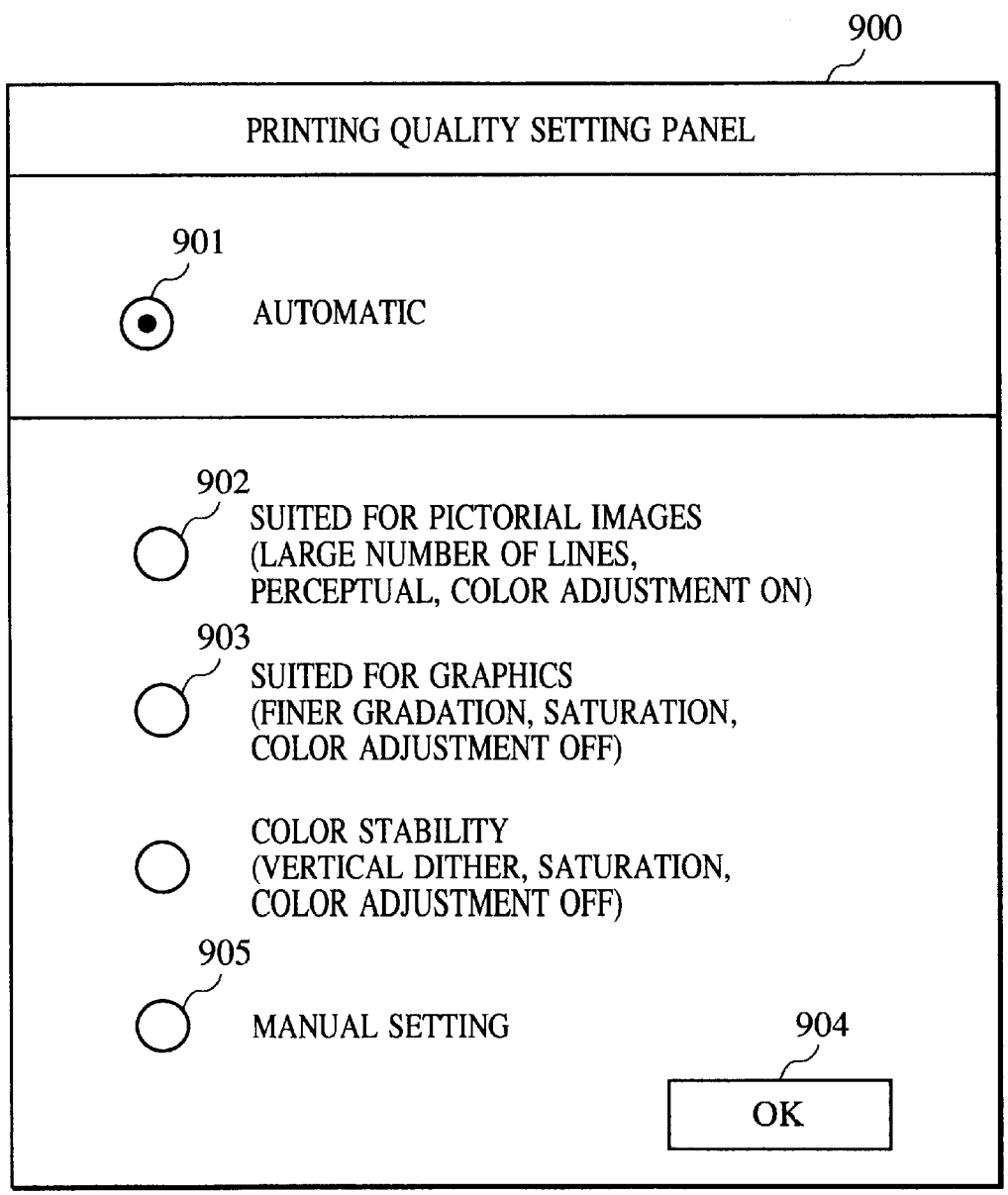
FIG. 11 shows a panel menu for selection of printing quality.

One example of a printing quality menu used in this embodiment is shown in FIG. 11. As shown, automatic setting (full-automatic mode) 901 is initially selected as default setting. If necessary, however, users can select another setting (semiautomatic mode or manual mode) by clicking the mouse 2110 on desired one of items displayed in the form of radio buttons as shown. In the full-automatic mode, the setting of color matching, half-toning and color adjustment processes is selected for the respective objects as listed in Tables 1, 3 and 4, respectively.

When pictorial-image suited setting 902, graphics suited setting 903, or color stability setting is selected, the semiautomatic mode becomes effective, whereby the color matching, half-toning and color adjustment processes of respective types shown in parentheses are carried out on the whole of an image.

Users who are not satisfied with the full-automatic mode and the semiautomatic mode can select the manual mode by depressing a manual setting button 905. The manual mode enables the users to designate free combinations of color matching, half-toning and color adjustment processes for each type of objects in detail at their discretion.

Figure 12:
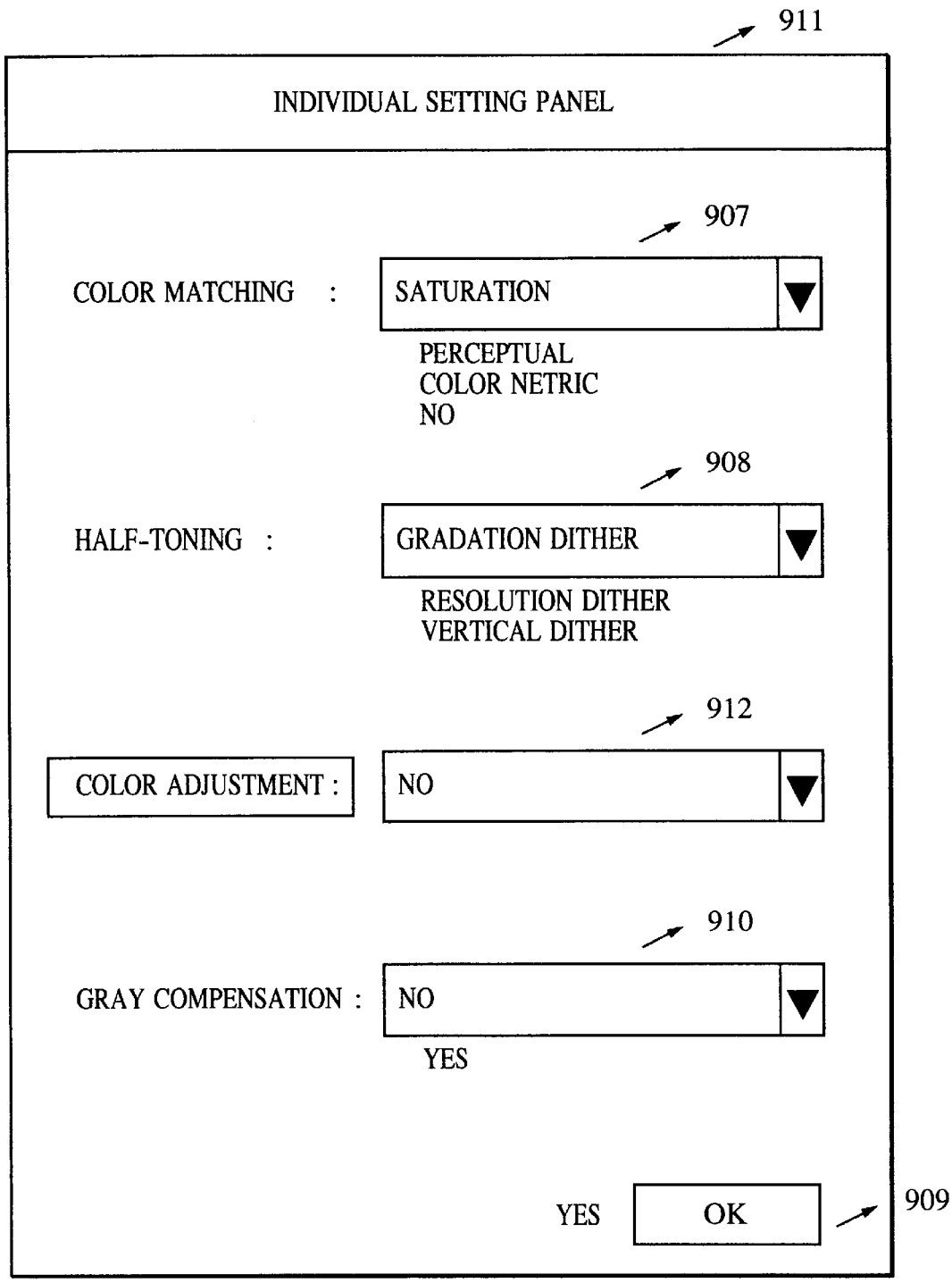
FIG. 12 shows a panel menu for selection of printing quality.

FIG. 12 shows a menu appearing when the manual setting button 905 is depressed. For each of the color matching, half-toning and color adjustment processes, the desired type of process can be selected using combination box menus 907, 908 and 912 as shown. In these menus, when users click the mouse on an arrow mark at the right end of each menu, a list of process types supported by the system. Clicking the mouse again on the desired process issues a trigger whereupon setting of the selected process is made. Setting quality parameters capable of being selected by users are shown below the menus 907, 908 and 912.

Upon users depressing an OK button 909 at the last, the printer driver 202 decides the type of color matching, half-toning and color adjustment processes for each object, and sets the information designated by users in corresponding flags CMS_image_flag, CMS_text_flag, CMS_graphics_flag, HT_image_flag, HT_text_flag, HT_graphics_flag, CA_image_flag, CA_text_flag, and CA_graphics_flag (step 9020). Here, CMS, HT and CA represent the color matching, half-toning and color adjustment process, respectively.

Next, when users perform various settings and start up the printing job, image information representing an image formed on the application is transmitted to the printer driver 2022 from the GDI 2021 (step 9030).

The color matching and color adjustment processes are executed on the side of the host computer 502, whereas the half-toning process is executed on the side of the controller 200. At the start of the printing job, the printer driver 2022 designates the half-toning process by using a PDL command or a JL (Job Language) command, which indicates the type of half-toning process, to the printer (step 9040).

Subsequently, the printer driver 2022 receives various drawing commands and color parameters for each page from the GDI 2021, and stores the current color information in a buffer area. The printer driver 2022 then determines based on the GDI function whether the type of drawing object is text, pictorial image, or graphics.

Depending on the type of drawing object, the color adjustment and color matching processes are executed in accordance with CA_*_flag and CMS_*_flag set in step 9020 (steps 9045 and 9050).

The color information having completed the color matching process is converted into PDL commands in the printer driver 2022 (step 9060).

In this connection, for characters and graphics, a color space compressing process is executed once for each object. For pictorial images, because each object holds a plurality of color data, color array information is given to the CMS module 2023 for an improvement of processing efficiency.

Then, the color space compressing process is repeatedly executed for the drawing object until the process for one page is ended (step 9070).

The processing on the printer side will be described below.

An outline of the processing flow in the printer has been described above, and hence the following description is made with the focus placed on the half-toning process, in particular, dithering.

Prior to describing practical dithering, the principle of simple multi-value coding will be first described in connection with an algorithm for an example in which an multi-valued 8-bit (256-level) input is coded into 2-bit (4-level) notation.

Figure 13:
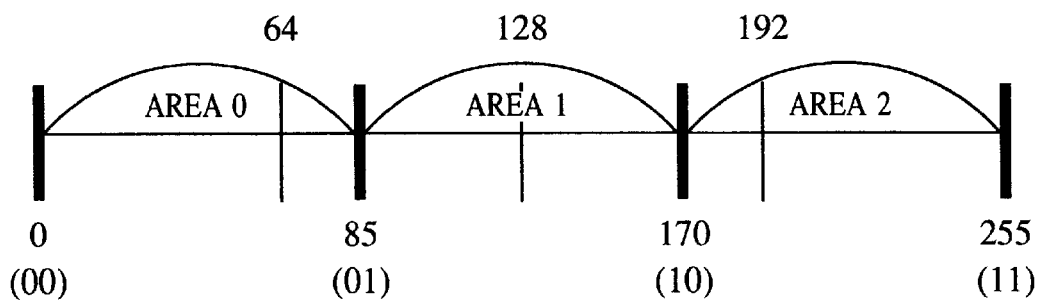
FIG. 13 is an explanatory view for dithering.

As shown in FIG. 13, the algorithm outputs 0 (00) when an input value of the pixel of interest is less than 64, 85 (01) when the input value is not less than 64 but less than 128, 170 (10) when the input value is not less than 128 but less than 192, and 251 (11) when the input value is not less than 192 but not more than 255. Thus, the binary coding is performed by determining to which one of AREA 0 to AREA 3 the input value belongs, and outputting a value corresponding to either end of the AREA based on whether the input value is larger or smaller than a threshold (64, 128 or 192) in the AREA. In FIG. 13, thick vertical lines represent demarcations between the AREAs, and output values represented at 8-bit level and 2-bit level are indicated under the thick vertical lines without and with ( ), respectively.

Figure 14:
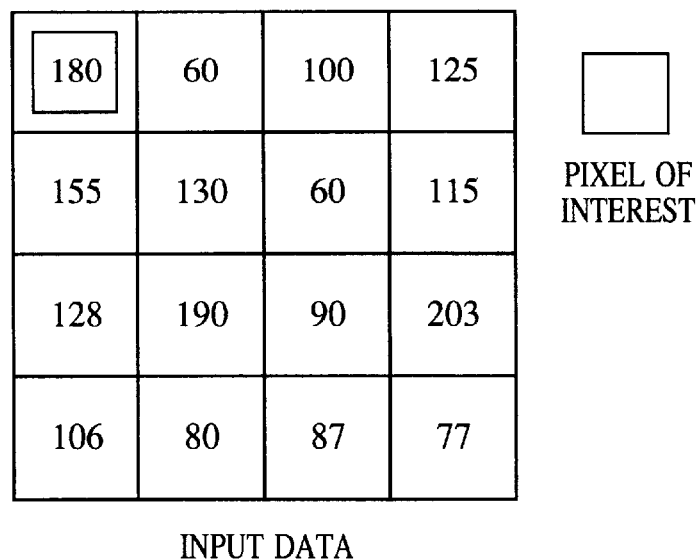
FIG. 14 is an explanatory view for dithering.
Figures 15, 16:
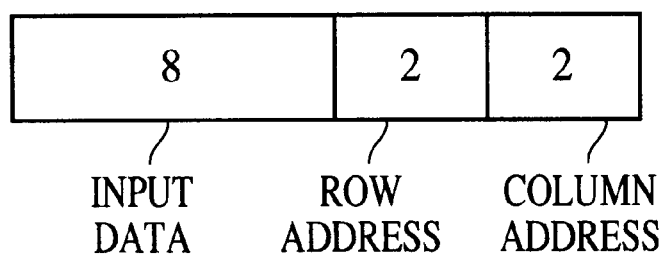
FIG. 15 is an explanatory view for dithering.
FIG. 16 is a representation for explaining the principle to realize the dithering by hardware.

One example of multi-value dithering will be described with reference to FIGS. 14 and 15. From both data of the pixel of interest shown in FIG. 14 and a value of a dither matrix, shown in FIG. 15, in a position corresponding to the pixel of interest, a threshold appropriate for that position is calculated. The data of the pixel of interest is then quantized based on the calculated threshold. The dither matrix is a 4*4 pattern, and the same pattern is repeatedly applied to page data in the page buffer. A maximum value of the dither matrix is given by 255/(bit levels—1). If there is a scale-up or scale-down process, the input data is already converted into a resolution adapted for the page memory.

One practical dithering algorithm will now be described with reference to FIG. 13. In the following description of detailed processing, the pixel of interest is assumed to have a value of 180.

After reading the pixel of interest in the input data, it is determined to which AREA the data of the pixel of interest belongs.

Then, a corresponding value of the dither matrix is read, and the threshold is modified to a value adapted for the determined AREA by using a formula below:

$$\text{threshold} = 74 + 85 \times 2 = 244$$

If the data of the pixel of interest is not less than the modified threshold, the maximum value of that AREA is given as an output value, and if it is less than the modified threshold, the minimum value of that AREA is given as an output value. That is, since the data (180) of the pixel of interest is less than the modified threshold (244), the minimum value (170) of that AREA is output.

A next pixel is then processed in a similar way.

From the standpoint of hardware, the above-mentioned process can be realized by a high-speed conversion process using a look-up table. The look-up table is prepared by storing 2-bit output values, which are resulted from the dithering, corresponding to respective positions of the 4*4 dither matrix beforehand for each of input levels ranging from 0 to 255. This case requires a table size of 256×4×4×2 bits=1024 bytes for each of YMCK. A resulting dither table shown in FIG. 17 is accessed by using a dither pointer shown in FIG. 16 in units of 2 bits. Note that the above table size is adapted to express data obtained from one type of dithering. Since this embodiment deals with maximum three types of objects (i.e., characters, pictorial images, and graphics), the system is required to secure a memory with a size at least three times the above table size therein.

Figure 9:
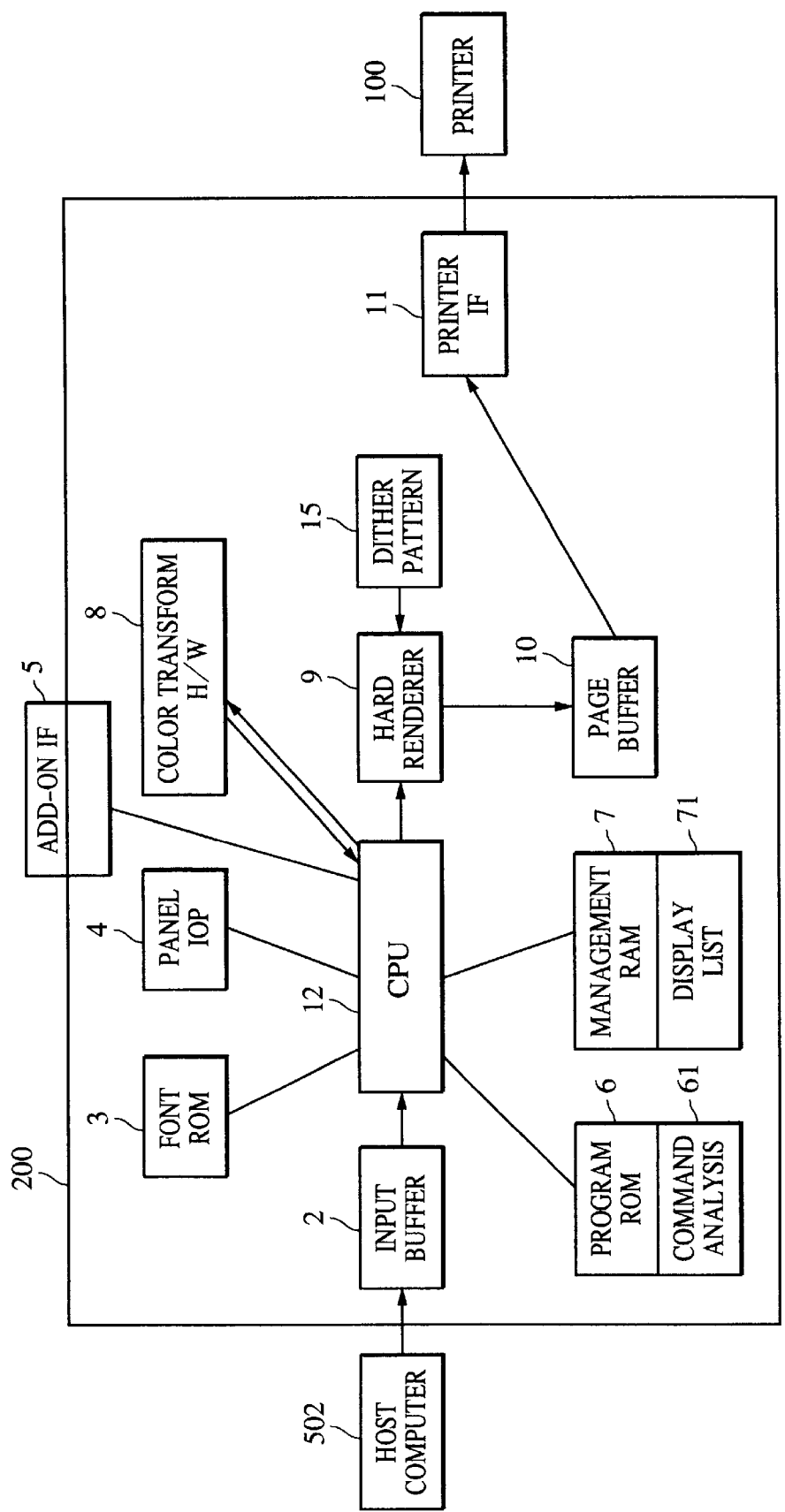
FIG. 9 is a block diagram of a controller system.

The processing executed by the dithering unit 15 shown in FIG. 9 will be described below.

At the start of the job, the dithering unit 15 analyzes PDL or JL commands sent from the host computer 502, creates a dither table corresponding to each drawing object, and forms a link between the object type and the dither table.

After that, whenever each drawing object is input as PDL data, the current dither pointer is set corresponding to the actual dither table, thus enabling the hard renderer 9 to execute rendering therein.

As described above, this embodiment can provide an interface with which even users who are not skilled in color processing and image processing can output a composite color document in a satisfactory manner. The interface of this embodiment is also simple and very convenient for users even in the case of troubleshooting as needed when an output result of the default processing is not satisfactory.

Modifications

The above embodiment has been described as executing the color matching process on the host side and the half-toning process on the printer side in response to an instruction from users. However, a similar advantage can also be obtained in the case of implementing both the processes on either the host side or the printer side.

Modification 1

Figure 18:
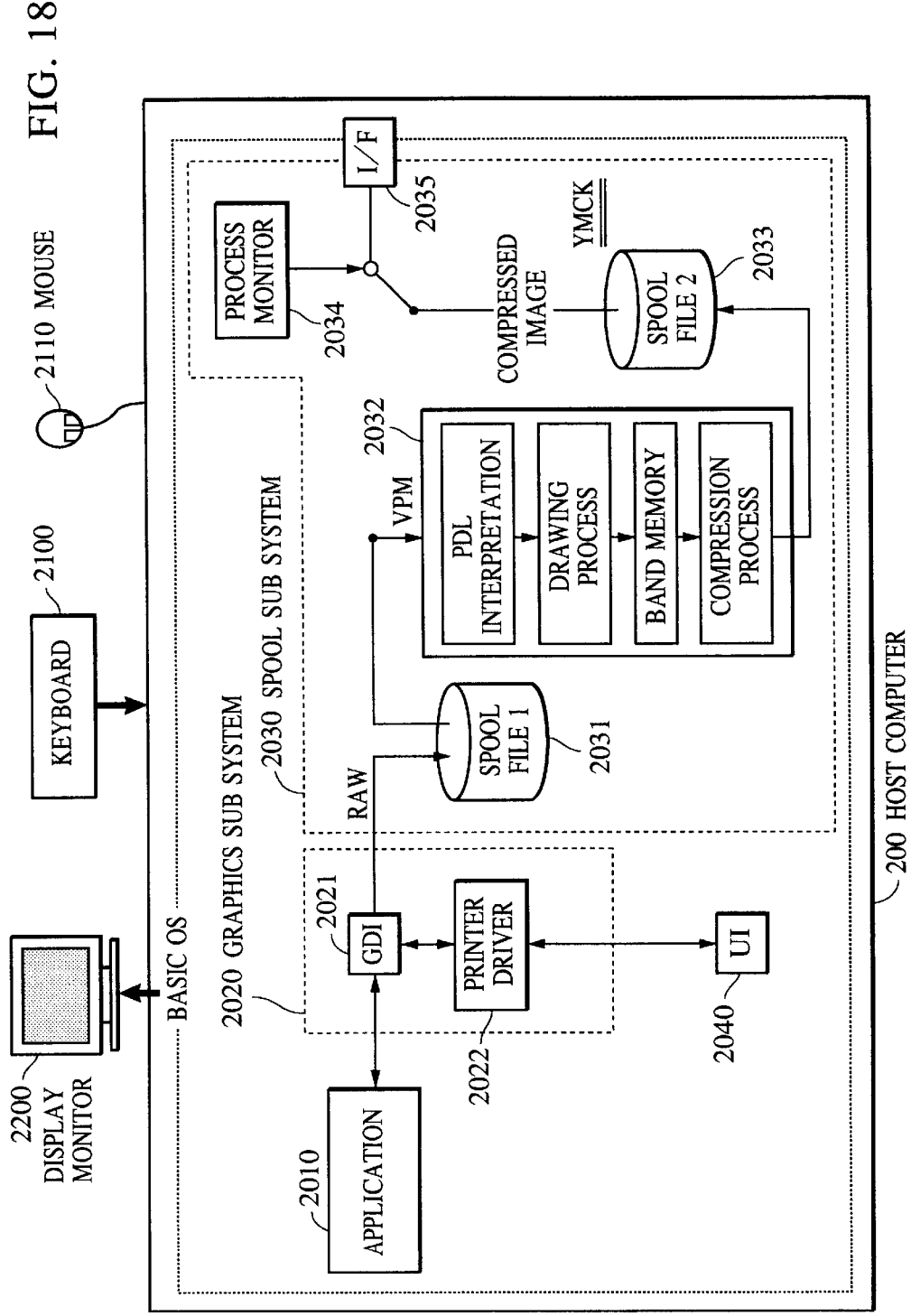
FIG. 18 is a block diagram showing Modification 1 (in which all processes are completed on the host side).

A modification wherein both the processes are executed on the host side will be described with reference to FIG. 18. In this modification, a spool sub system 2030 on the host side is configured so as to implement a function equivalent to that of the rendering system on the printer side.

The spool sub system 2030 comprises a spool file 1 (practically in the form of a hard disk) 2031 as a first data storage means, a Virtual Printer Module (abbreviated to "VPM" hereinafter) 2032 as a first print image developing means for reading PDL codes stored in the spool file 1 and executing a print image developing process based on the read data as with the PDL controller 200 in the printer, a spool file 2 (practically in the form of a hard disk) 2033 as a second data storage means for spooling print image data that has been produced and compressed by the VPM, and a process monitor 2034 for monitoring the progress of processing in the VPM and the progress of processing in the printer engine 100.

The VPM 2032 is made up of a PDL interpreting portion, a drawing process portion, a band memory, and a compression process portion. These processing portions correspond to the above-described processing components in the printer controller 200 and are equivalent to them from the viewpoint of functional. For example, the PDL interpreting portion corresponds to the PDL analyzing portion 61 in the controller 200, and the drawing process portion corresponds to the hard renderer 9 in the controller 200. The band memory corresponds to the page buffer 10 in the controller 200 by being combined with the spool file 2 on the host side, and the compression process portion corresponds to the processing executed by both the hard renderer 9 and the page buffer 10 in the controller 200. Further, when Windows 95 is employed as a basic OS for the system, the VPM 2032 is assumed to operate as a process that is started up from a module called a print processor.

According to this modification, data of compressed YMCK images is transferred from the host computer 502 to the printer 100, and therefore the printer 100 is just required to expand the compressed YMCK images. As a result, the image processing can be realized with a small load and a reduced cost.

Modification 2

Figure 19:
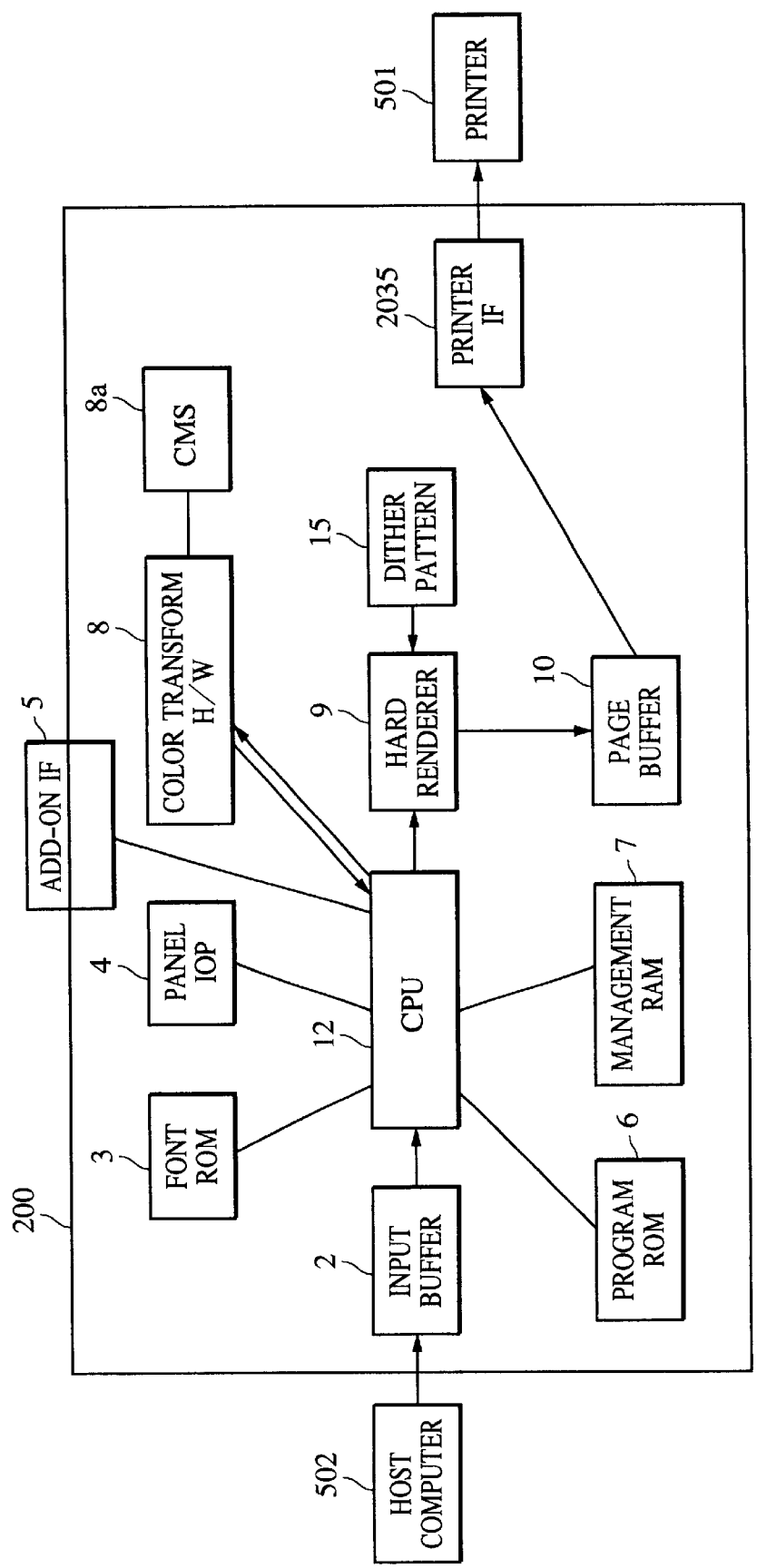
FIG. 19 is a block diagram showing Modification 2 (in which all processes are completed on the printer side).

A modification wherein all kinds of processing related to printing quality are executed on the printer side will be described with reference to FIG. 19. A system configuration of this modification is analogous to that shown in FIG. 9, but differs from the latter in that a color space compressing process designated by users is applied to image data in a CMS module 8a before the data is converted from the RGB space into the YMCK space by the color transform H/W 8 shown in FIG. 9. The CMS module 8a has a function equivalent to that of the CMS module 2023 installed on the host side. With the system of this modification, the load of processing on the host side is reduced, which results in an advantage of improving performance when a low-price PC is employed on the host side.

Further, while the UI process has been described in the above embodiment as being executed on the host side, the UI process may be implemented on the printer side instead. Thus, by utilizing the panel 4 of the printer, displaying menus on the panel and allowing users to select desired one of items represented in the form of buttons, the UI process on the printer side can also realize the equivalent function to that obtained on the host side.

Modification 3

In the above embodiment, the color matching, half-toning and color adjustment processes have been described as processes to be executed depending on the types of objects or over the whole of a page. As another optional process, however, it is also possible to likewise designate a mode of expressing a print color with YMCK inks through usual masking and UCR (Under Color Removal) processes, or a mode of expressing a print color with K ink only, when color information of achromatic gray values (R=G=B) is input. This Modification 3 is adapted for such a case.

In this modification, a default process is set to perform printing with K ink only for characters in which sharpness of printing is generally preferred, and to perform printing with YMCK inks for pictorial images and graphics in which much importance is placed on continuity between different levels of density. While the color transform H/W 8 in FIG. 9 executes a process for transform from the RGB into YMCK space, the CPU 12 calculates an optimum corresponding density of K ink in the mode of printing data with K ink only. This process is called gray compensation, and the printing using K ink only is defined as printing with gray compensation. One example of a user interface for individual setting of printing quality to turn on or off the gray compensation according to this embodiment is denoted by 910 in FIG. 12, and the default setting of the gray compensation for respective types of objects is listed in Table 4 below.

TABLE 4

| Characters | With gray compensation |
|---|---|
| Graphics | With gray compensation |
| Pictorial images | Without gray compensation |

Modification 4

As another characteristic of printing quality, there is a gamma characteristic. The gamma characteristic is a parameter showing the relationship between an input and an output of color luminance or density. In printing carried out by electrophotographic printers, a gamma value is generally set to 1.4 or thereabout. For example, the gamma value can be changed for each object to one of typical values (e.g., 1.0, 1.4, 1.5, 1.8 and 2.2) which are determined beforehand for a peripheral unit, or it can be changed over the entirety of a document. From the viewpoint of hardware processing, gamma correction can be implemented by applying a one-dimensional LUT (Look-Up Table), which corresponds to a gamma characteristic curve, to each of YMCK colors.

As a higher degree of function, it is also possible to designate a gamma characteristic curve by users employing a curve drawing tool at the time of printing, and to execute the gamma correction with a corresponding LUT.

Modification 5

Figure 22:
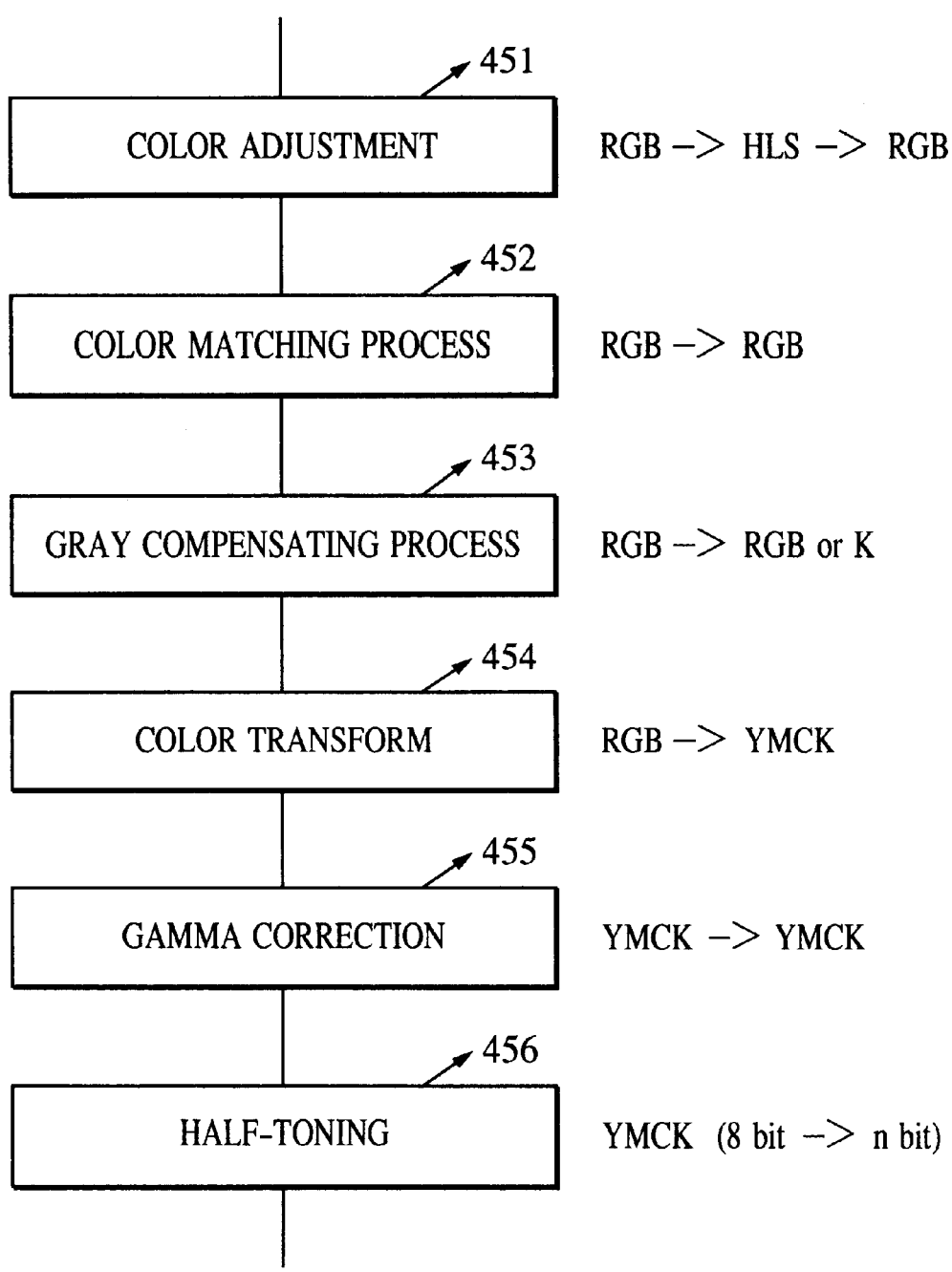
FIG. 22 is a flowchart of processing in Modification 6.

FIG. 22 shows a processing flow in the case of applying both the gray compensation of Modification 3 and the gamma correction of Modification 4.

The color designated by an application is subjected to a process for correcting a variation in coloring of a printer with the color adjustment function (step 451). In next step 452, a color space compressing process optimum for each object is executed. In step 453, a gray compensating process is executed to print pure gray by replacing achromatic data (R=G=B) in the RGB data with data of black only.

In step 454, the RGB data is transformed into data of basic toner colors (YMCK) used in the printer. At this point, a gamma correction step 455 for correcting a density gamma value is executed on data for each color of YMCK if necessary. Further, a process of measuring a gamma characteristic of the printer by using an external scanner or the like and making the printer characteristic matched with an ideal characteristic is also executed at this point as needed. Finally, in step 456, a half-toning process is executed so that 8-bit YMCK data is matched with the bit depth of a printer controller.

Note that the above processing can be performed for various types of objects individually by providing a processing path to permit the above-described processing flow for each type of object.

Modification 6

This Modification 6 employs a histogram equalization method with which histograms of respective colors in the RGB color space are calculated for an input image and an accumulative curve is calculated. Then, if there is a deviation in distribution of the histograms, a color luminance distribution is modified to become smooth. This method makes it possible to improve tone of a photographic image, particularly, (in points of avoiding overexposure, underexposure, color fogging, etc.). Since the histogram equalization process is effective to pictorial images, it is turned off as default setting for other objects, i.e., characters and graphics. This process however requires an image to be read twice, and hence reduces a processing speed as a whole. For that reason, it is general to read a part of pixels rather than all pixels, to perform a statistical process, and then to execute color correction for the whole of an image. In addition, since the histogram equalization process is essentially contradictory to the color matching process, the system is set to automatically turn off the color matching process (i.e., cause the processing flow to run through the color matching process) when the histogram equalization process is turned on.

Modification 7

In the above embodiment, the types of objects have been described as including characters, pictorial images, and graphics. However, the types of objects can further include gradation objects. This Modification 7 is adapted for such a case. In this case, color interpolation of a gradation pattern is executed by using an isometric color space, such as CIELab or CIEXYZ, rather than a usual color space such as RGB. As a result, smooth change of coloring can be realized. To implement this embodiment, the color transform H/W 8 in the printer executes a transforming process from CIELab to YMCK.

Modification 8

The system may be configured such that users can register process types which are selectable in the semiautomatic mode.

This modification can be implemented, for example, by providing a radio button for starting up a registration process in the user interface shown in FIG. 11, and allowing users to set a processing title and a combination of the individual types of color matching, half-toning and color adjustment processes.

Other Embodiments

The present invention may be applied to a system comprising a plurality of devices (such as a host computer, an interface unit, a reader and a printer), or to a single device (such as a copying machine or a facsimile machine).

The above-described functions of the embodiment can also be achieved by supplying, to a computer (CPU or MPU) in an apparatus or system that is connected to any of the above various devices, program codes of software to implement the functions of the embodiment and causing the computer in the apparatus or system to operate the device in accordance with the stored program so that the functions of the embodiment are realized with the operation of the device. This case is also involved within the scope of the present invention.

In such a case, the program codes of software serve in themselves to realize the above-described functions of the embodiment. Hence, the program codes themselves and means for supplying the program codes to the computer, e.g., a storage medium storing the program codes therein, constitute the present invention.

Storage mediums for storing the program codes may be, e.g., floppy disks, hard disks, optical disks, magneto-optical disks, CD-ROMs, magnetic tapes, nonvolatile memory cards, and ROMs.

Further, the above-described functions of the embodiment are realized by not only a computer executing program codes supplied to it, but also the program codes cooperating an OS (Operating System), another application software or the like, which is working on the computer, to realize the functions of the embodiment. The program codes used in the above case are of course one of embodiments of the present invention.

Additionally, the supplied program codes may be written in a memory of a function add-on board incorporated in a computer or a function add-on unit connected to the computer, and then a CPU or the like incorporated in the function add-on board or unit may execute a part or the whole of actual processing in accordance with instructions from the program codes, thereby realizing the above-described functions of the embodiment. It is needless to say that such a case is also involved within the scope of the present invention.

It should be understood that the present invention is not limited to the embodiment described above, but can be varied or modified in various ways without departing from the scope of the present invention defined in the attached claims.

What is claimed is:

1. An image processing method for executing color processing on an input image, which may include a plurality of object types, and outputting processed data to an output unit, said method comprising the steps of:

setting color processing conditions from a plurality of color processing conditions, which include color matching and half-toning, in accordance with an instruction from a user; and executing color processing in accordance with the color processing conditions set in said setting step, wherein the setting of the color processing conditions in said setting step is selectively made in one of, a) an automatic mode, in which the color processing is automatically executed in accordance with a preset combination of object types and the color processing conditions, b) a semiautomatic mode, in which the same color processing, selected by a user from among a plurality of registered combinations of image processing conditions, is set as one combination of image processing conditions regardless of the object types in the input image, and c) a manual mode, in which a combination of the color processing conditions is set individually with respect to the object types of the input image in accordance with an instruction from the user, and wherein setting of the automatic mode and semiautomatic mode is performed by the user making a single selection.

2. An image processing method according to claim 1, wherein:

the color processing includes a color matching process and a half-toning process;

the color matching process is executed in a printer driver; and the half-toning process is executed in a printer device including the output unit.

3. An image processing method according to claim 1, wherein, in the semiautomatic mode, one of the plurality of registered combinations of image processing conditions is selected in accordance with an instruction from the user based on an intended purpose for processing of the input image.

4. An image processing method according to claim 1, wherein a priority of modes is given in the order of the automatic mode, the semiautomatic mode, and the manual mode, and wherein the automatic mode is set as a default setting.

5. An image processing method according to claim 1, wherein one of the plurality of color processing conditions of image processing conditions is a gray compensation process which outputs achromatic data with K ink only.

6. An image processing method according to claim 1, wherein the plurality of object types of the input image may include graphics, texts, and pictorial images.

7. An image processing method according to claim 6, wherein the plurality of object types of the input image may include a gradation object expressed by continuous colors.

8. An image processing apparatus for executing color processing on an input image, which may include a plurality of object types, and outputting processed data to an output unit, said apparatus comprising:

means for setting color processing conditions from a plurality of color processing conditions, which include color matching and half-toning, in accordance with an instruction from a user; and means for executing color processing in accordance with the color processing conditions set by said setting means, wherein the setting of the color processing conditions by said setting means is selectively made in one of, a) an automatic mode, in which the color processing is automatically executed in accordance with a preset combination of object types and the color processing conditions, b) a semiautomatic mode, in which the same color processing, selected by a user from among a plurality of registered combinations of image processing conditions, is set as one combination of image processing conditions regardless of the object types, and c) a manual mode, in which a combination of the color processing conditions is set individually with respect to the object types in the input image in accordance with an instruction from the user, and wherein setting of the automatic mode and semiautomatic mode by said setting means is performed by the user making a single selection.

9. A recording medium for recording a program to implement an image processing method for executing color processing on an input image, which may include a plurality of object types, and outputting processed data to an output unit, said program comprising:

a module for setting color processing conditions from a plurality of color processing conditions, which include color matching and half-toning, in accordance with an instruction from a user; and a module for executing color processing in accordance with the color processing conditions set by said setting module, wherein setting the color processing conditions by said setting module is selectively made in one of, a) an automatic mode, in which the color processing is automatically executed in accordance with a preset combination of object types and the color processing conditions, b) a semiautomatic mode, in which the same color processing, selected by a user from among a plurality of registered combinations of image processing conditions, is set as one combination of image processing conditions regardless of the object types in the input image, and c) a manual mode, in which a combination of the color processing conditions is set individually with respect to the object types in the input image in accordance with an instruction from the user, and wherein setting of the automatic mode and semiautomatic mode by said setting module is performed by the user making a single selection.

* * * * *

UNITED STATES PATENT AND TRADEMARK OFFICE
CERTIFICATE OF CORRECTION

PATENT NO. : 6,751,346 B2
DATED : June 15, 2004
INVENTOR(S) : Haruo Shimizu

It is certified that error appears in the above-identified patent and that said Letters Patent is hereby corrected as shown below:

<u>Title page,</u>
Item [30], Foreign Application Priority Data, "Jan. 11, 1998" should read
-- Jan. 11, 1999 --.

Signed and Sealed this

Twenty-eighth Day of March, 2006

JON W. DUDAS
*Director of the United States Patent and Trademark Office*